US009513806B2

(12) United States Patent
Skjolsvold et al.

(10) Patent No.: US 9,513,806 B2
(45) Date of Patent: Dec. 6, 2016

(54) DIMENSION BASED LOAD BALANCING

(71) Applicant: MICROSOFT CORPORATION, Redmond, WA (US)

(72) Inventors: Arild Skjolsvold, Kenmore, WA (US); Xinhua Ji, Redmond, WA (US); Ju Wang, Redmond, WA (US); Bradley Gene Calder, Bellevue, WA (US); Ralph Burton Harris, III, Woodinville, WA (US); Hosung Song, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 167 days.

(21) Appl. No.: 14/305,987

(22) Filed: Jun. 16, 2014

(65) Prior Publication Data
US 2015/0319230 A1    Nov. 5, 2015

Related U.S. Application Data

(63) Continuation-in-part of application No. 14/267,659, filed on May 1, 2014.

(51) Int. Cl.
*G06F 13/28* (2006.01)
*G06F 3/06* (2006.01)
*H04L 29/08* (2006.01)
(Continued)

(52) U.S. Cl.
CPC .......... *G06F 3/0604* (2013.01); *G06F 9/5077* (2013.01); *G06F 9/5083* (2013.01); *G06F 17/30929* (2013.01); *H04L 43/04* (2013.01); *H04L 67/101* (2013.01);
(Continued)

(58) Field of Classification Search
USPC ............... 711/112, 114, 165; 707/E17.044, 707/999.102
See application file for complete search history.

(56) References Cited

U.S. PATENT DOCUMENTS 8,433,848 B1   4/2013 Naamad et al.
8,452,819 B1   5/2013 Sorenson, et al.
(Continued)

OTHER PUBLICATIONS

"International Search Report and Written Opinion Issued in PCT Application No. PCT/US2015/028310", Mailed Date: Aug. 12, 2015, 13 Pages.
(Continued)

*Primary Examiner* — Kyung H Shin
(74) *Attorney, Agent, or Firm* — Ben Tabor; Kate Drakos; Micky Minhas

(57) ABSTRACT

One method includes receiving partitions, generating assignment plans for assignment of the partitions to servers based on dimensional values of dimensions as determined by different assignment heuristics, selecting one of the assignment plans for execution based on analyzing the dimensional values in accordance with the assignment plans, and executing the selected assignment plan on scalable storage. Another method includes determining, for a triggered optimization module that a server is over utilized on a dimension, selecting candidate operations for partitions assigned to the server, for a higher priority optimization module than the triggered optimization module, removing a candidate operation from the candidate operations that would diminish a modeled state of scalable storage, determining an operation of the candidate operations that would improve the modeled state of the scalable storage with respect to a metric of the dimension on the server, and executing the operation on the scalable storage.

40 Claims, 11 Drawing Sheets

(51) Int. Cl.
*H04L 12/26* (2006.01)
*G06F 17/30* (2006.01)
*G06F 9/50* (2006.01)

(52) U.S. Cl.
CPC ........ *H04L 67/1097* (2013.01); *G06F 3/0611* (2013.01); *G06F 3/0614* (2013.01)

(56) References Cited

U.S. PATENT DOCUMENTS

| | | | |
|---|---|---|---|
| 8,566,546 B1* | 10/2013 | Marshak | G06F 3/0604 711/112 |
| 8,566,553 B1 | 10/2013 | Marshak et al. | |
| 8,661,136 B2 | 2/2014 | Tumbde et al. | |
| 8,838,887 B1* | 9/2014 | Burke | G06F 3/0611 711/112 |
| 2003/0037092 A1 | 2/2003 | McCarthy et al. | |
| 2008/0195646 A1* | 8/2008 | Meijer | G06F 17/30929 |
| 2011/0202723 A1* | 8/2011 | Yochai | G06F 3/0614 711/114 |
| 2012/0271996 A1 | 10/2012 | Jenkins et al. | |
| 2013/0054809 A1 | 2/2013 | Urmanov et al. | |
| 2013/0204991 A1 | 8/2013 | Skjolsvold et al. | |
| 2014/0006357 A1 | 1/2014 | Davis et al. | |

OTHER PUBLICATIONS

"International Search Report and Written Opinion Issued in PCT Patent Application No. PCT/US2015/028414", Mailed Date: Jul. 8, 2015, 10 Pages.

Addis, et al., "A Hierarchical Approach for the Resource Management of Very Large Cloud Platforms", In IEEE Transactions on Dependable and Secure Computing, vol. 10, Issue 5, Jan. 10, 2013, pp. 253-272.

Morillo, et al., "A Comparison Study of Evolutive Algorithms for Solving the Partitioning Problem in Distributed Virtual Environment Systems", In Parallel Computing, vol. 30, Issue 5, May 1, 2004, pp. 585-610.

Nam, et al., "Multiple Query Scheduling for Distributed Semantic Caches", In Journal of Parallel and Distributed Computing, vol. 70, Issue 5, May 1, 2010, pp. 598-611.

Kunkle, et al., "A Load Balancing Framework for Clustered Storage Systems," In Proceedings of the 15th International Conference on High Performance Computing, Dec. 17, 2008, pp. 57-72.

Zlotkin, Gilad ., "Cloud Load Balancing Services," published Apr. 5, 2012; http://blog.radware.com/applicationdelivery/cloudcomputing/2012/04/cloud-load-balancing-services/; 9 pages.

Taton, et al., "Self-Optimization of Internet Services with Dynamic Resource Provisioning," Institut National De Recherche En Informatique Et En Automatique, INRIA-00294071, version 1, Jul. 2008, 32 pages.

Jafari, et al., "Optimization Load Balancing Scheduling Algorithm in Distributed Multi-Agent Systems," In International Journal of Computer Science & Network Solutions vol. 1, No. 1, Aug. 2013, pp. 32-44.

"Second Written Opinion Issued in Patent Application No. PCT/US2015/028414", Mailed Date: Mar. 18, 2016, 09 Pages.

"Second Written Opinion Issued in PCT Application No. PCT/US2015/028310", Mailed Date: Mar. 10, 2016, 5 Pages.

U.S. Appl. No. 14/267,659, filed May 1, 2014, Ju Wang.

Non-Final Office Action dated May 31, 2016 in U.S. Appl. No. 14/267,659, 14 pages.

International Preliminary Report on Patentability dated Jul. 4, 2016 in PCT Application No. PCT/US2015/028310, 19 pages.

International Preliminary Report on Patentability dated Aug. 17, 2016 in PCT Application No. PCT/US2015/028414, 16 pages.

* cited by examiner

DIMENSION BASED LOAD BALANCING

RELATED APPLICATION

The present application claims priority from, and is a continuation-in-part of, co-pending application Ser. No. 14/267,659 filed May 1, 2014, entitled "Load Balancing Scalable Storage Utilizing Optimization Modules." The above referenced application is incorporated by reference in its entirety.

BACKGROUND

Distributed systems, including server farms, web services, and the like, have become increasingly common to provide resources, such as computational and storage resources. The resources may be provided by a network of servers, which can be part of a scalable system to more efficiently store, retrieve, and query over data throughout the network. It may be desirable to distribute workloads across the servers, in order to optimize resource usage, maximize throughput, minimize response time, avoid overload of one of the servers, and/or achieve other load balancing objectives. However, due to the complexity of modem distributed systems, it can be challenging to effectively and efficiently manage and implement the load balancing objectives.

SUMMARY

The present disclosure is directed, in part, to load balancing scalable storage, substantially as shown in and/or described in connection with at least one of the figures, and as set forth more completely in the claims Implementations of the present disclose can provide for load balancing utilizing dimensions, where each dimension can correspond to one or more resources of the scalable storage.

One or more approaches can be implemented for load balancing. In some implementations, load balancing logic can select between the different approaches. In other implementations, only one of the approaches may be employed.

In one exemplary approach, a framework for load balancing includes a plurality of optimization modules. The plurality of optimization modules comprises optimization routines for optimizing the scalable storage with respect to load balancing. The optimization routines can be utilized to select one or more load balancing operations that may further optimization goals of an optimization module for load balancing. One or more of the optimization modules can comprise an optimization goal corresponding to load balancing with respect to dimensions. As another example, different optimization modules can comprise different optimization goals from one another, where each optimization goal corresponds to load balancing with respect to one or more dimensions.

The optimization modules can comprise trigger conditions that may be utilized to trigger a corresponding optimization routine. Furthermore, optimization modules can have priorities with respect to one another. An optimization routine of a triggered optimization module may take these priorities into account. For example, the optimization routine may defer to higher priority optimization modules. Additionally, the optimization routines may consider lower priority optimization modules. Thus, the priorities can be utilized to establish a hierarchy with respect to the optimization goals being implemented by the optimization routines.

The optimization routines may utilize evaluation scores that quantify a modeled state of the scalable storage with respect to an optimization goal of a corresponding optimization module. An evaluation score can therefore be utilized to characterize load balancing operations with respect to the optimization goal, without necessarily executing the load balancing operations. For example, load balancing operations can be characterized as diminishing, improving, or substantially maintaining the modeled state of the scalable storage. Thus, the evaluation scores can be utilized in an optimization routine to filter load balancing operations by considering a triggered optimization module, as well as other optimization modules.

In another exemplary approach, partitions are received for assignment to servers of the scalable storage. The partitions can have partition values of dimensions, where each of the dimensions corresponds to one or more resources of the scalable storage. Assignment plans can be generated for the assignment of the partitions to servers. The assignment plans are determined by different assignment heuristics, which results in different assignment plans. One of the generated assignment plans is selected for execution on the scalable storage based on analyzing the dimensional values of the assignment plans, which can include partitions values and/or server values.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present disclosure is directed, in part, to load balancing scalable storage. In one respect, implementations of the present disclosure provide a framework for load balancing that includes a plurality of optimization modules that can be utilized for selecting one or more load balancing operations to be executed on the scalable storage. Each optimization module may have an optimization goal with respect to load balancing, which may be carried out by an optimization routine. Optimization routines can employ various types of optimization functions. Some of these optimization functions may be specific to a particular optimization module and others may be shared. Furthermore, an optimization routine may utilize an optimization function of a different optimization module than its corresponding optimization module, for example, to consider an optimization goal of the different optimization module. The framework advantageously allows for highly extensible load balancing logic, in which optimization goals may easily and efficiently be added, removed, or modified.

Figure 1:
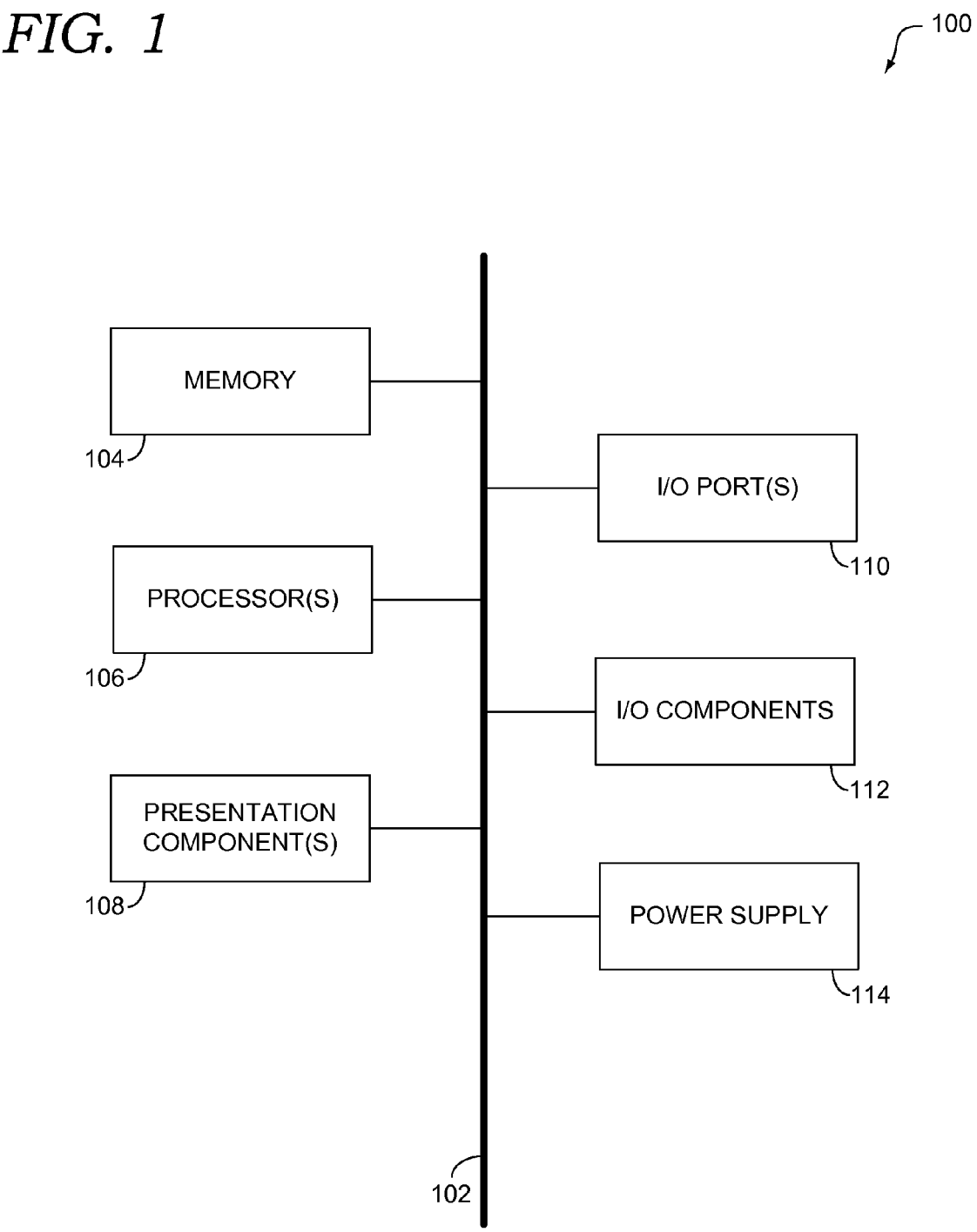
FIG. 1 is a diagram of an exemplary computing environment suitable for use in implementations of the present disclosure.

Referring to FIG. 1, FIG. 1 is a diagram of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100.

Illustrative I/O components 112 include a microphone, joystick, game pad, satellite dish, scanner, printer, wireless device, etc.

Figure 2:
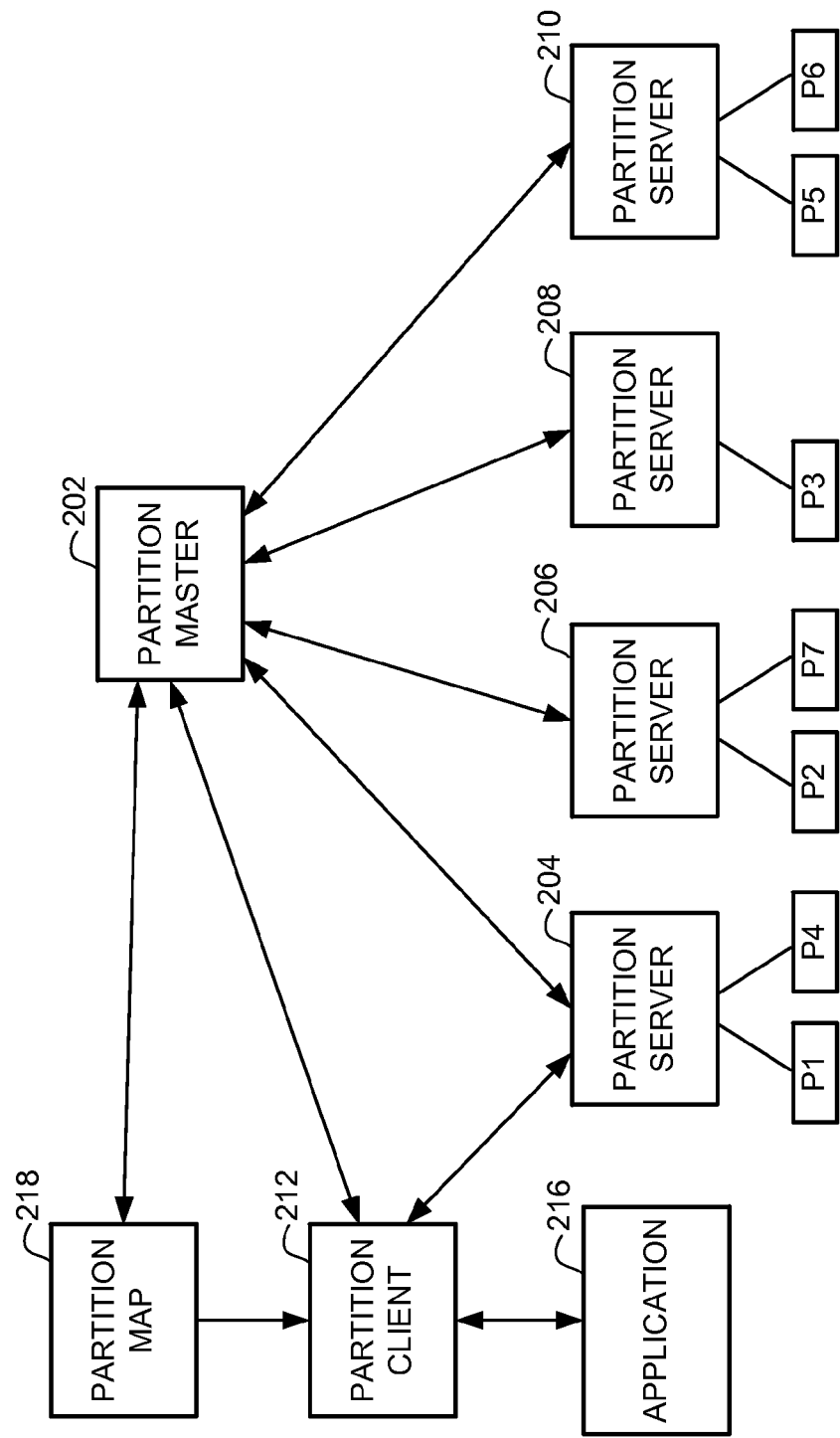
FIG. 2 illustrates an exemplary system in which implementations of the present disclosure may be employed.

Referring now to FIG. 2, FIG. 2 illustrates an exemplary system in which implementations of the present disclosure may be employed. In particular, FIG. 2. shows a high level architecture of scalable storage 200 (also referred to herein as "distributed system 200") in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, distributed system 200 includes master 202 (e.g. partition master 202), servers 204, 206, 208, and 210 (e.g. partition servers 204, 206, 208, and 210), and client 212 (e.g. partition client 212). Each may reside on any type of computing device, which may correspond to computing device 100 described with reference to FIG. 1, for example. The components of distributed system 200 may communicate with each other over a network, which may include, without limitation, one or more local area networks (LANs) and/or wide area networks (WANs). Although a single master, four servers, and a single client are shown in FIG. 2, any number of masters, servers, and clients may be employed within distributed system 200 within the scope of implementations of the present disclosure.

In distributed system 200, the servers, such as servers 204, 206, 208, and 210 are utilized to store and provide access to a storage system, for example, a scalable storage system. Master 202 is configured to manage the servers. Furthermore, client 212 is configured to provide applications, such as application 216, access to the scalable storage system.

Stored data of scalable storage 200 is divided amongst a plurality of partitions. For example, scalable storage 200 can comprise a key space divided amongst the plurality of partitions. Master 202 is configured to assign the partitions to servers 204, 206, 208, and 210, and/or other servers of distributed system 200 not shown. Master 202 can also be configured to determine when a partition of the partitions is not hosted by any server due to a failure and reassign the partition to a different server. Master 202 is further configured to control load balancing of the partitions on servers 204, 206, 208, 210, and/or other servers of distributed system 200 not shown. Additionally, Master 202 is configured to monitor resource utilization with respect to any of the partitions and/or servers 204, 206, 208, and 210, and/or other servers of distributed system 200 not shown.

Each server of distributed system 200, such as servers 204, 206, 208, and 210, can be responsible for providing read and write access to zero to many partitions assigned to the server. Furthermore, each of the partitions can be assigned to a single one of the servers. In the example shown in FIG. 2, server 204 is hosting partitions P1 and P4, server 206 is hosting partitions P2 and P7, server 208 is hosting partition P3, and server 210 is hosting partitions P5 and P6.

Client 212 is linked into an application, such as application 216. In some implementations client 212 is configured to issue commands to some of the partitions (e.g. partitions P1, P2, P3, P4, P5, P6, and P7) hosted by servers 204, 206, 208, and 210 and/or other servers of distributed system 200. Also in some implementations, client 212 may communicate with the application indirectly, for example, through a virtual IP and software load balancer or other means that directs communication requests to a front-end. The front-end can utilize a partition map, such as partition map 218, to determine which of the servers is hosting (mapped to) which of the partitions and can send commands to those servers. Results of the commands can be received back from the servers and can be passed to the application. The partition map stores mappings between the partitions and the servers they are assigned to, and can typically be maintained by a master, such as master 202.

Having described various aspects of distributed system 200, it is noted that any number of components may be employed to achieve the desired functionality within the scope of the present disclosure. Although the various components of FIG. 2 are shown with lines for the sake of clarity, in reality, delineating various components is not so clear, and metaphorically, the lines may more accurately be grey or fuzzy. Further, although some components of FIG. 2 are depicted as single components, the depictions are exemplary in nature and in number and are not to be construed as limiting for all implementations of the present disclosure.

As indicated above, the servers of distributed system 200 are configured host partitions, thereby providing various resources for the partitions, which can include computational and storage resources. The partitions can, in turn, be associated with workloads of one or more applications. It may be desirable to adjust the distribution of the workloads across the servers, in order to optimize resource usage, maximize throughput, minimize response time, avoid overload of one of the servers, and/or achieve other load balancing objectives. In order to achieve these and other load balancing objectives, one or more masters, such as master 202 can be configured to execute any of various load balancing operations on the partitions assigned to the servers of distributed system 200. In various implementations, potential load balancing operations are associated with partitions assigned to servers of the scalable storage. Some exemplary load balancing operations are described below. However, the present disclosure is not limited to these load balancing operations.

One type of load balancing operation, which can be executed by master 202 comprises a movement of one of the partitions to a different one of the servers of distributed system 200 (movement operation). For example, assume that server 204 has excessive CPU utilization and server 206 has low CPU utilization. Partition P1 may be moved from server 204 to server 206 so that the CPU utilization attributable to partition P1 can instead be accommodated for by server 206. This can relieve server 204 of the excessive CPU utilization, thereby improving load balancing with respect to CPU utilization.

It is noted that movement of a partition does not require physical movement of data at the storage level. Rather, in various implementations, a partition can be moved to another server by reassigning or remapping a partition range assignment of the partition to a new server (e.g. in a partition map). In particular, the partitions of the scalable storage can each correspond to a range of keys in a partitioning index for an object being stored. Exemplary objects include a blob, a table, and a queue. Assigning partitions to partition servers may not move any data stored by the partitions around. Rather, assigning partitions may inform the servers as to what key range(s) of the index the servers are responsible for. For example, master 202 can perform the movement by offloading the partition from one server, assigning the partition to another server, and updating the partition map to reflect that the partition is assigned to the new server.

Another type of load balancing operation, which can be executed by master 202 comprises a splitting of one of the partitions into multiple partitions to be assigned to ones of the servers of distributed system 200 (splitting operation). For example, assume again that server 204 has excessive CPU utilization and server 206 has low CPU utilization. Partition P1 may be split into multiple partitions in a load balancing operation. One or both of the multiple partitions may be assigned to a different server than server 204, such as server 206. In this way, the CPU utilization attributable to partition P1 can be accommodated for by multiple ones of the servers thereby reducing the overall CPU utilization on server 204. Again, splitting of a partition does not require physical movement of data at the storage level. Rather, in various implementations, a partition can be split by updating the partition map to represent the partition as multiple partitions, which are assigned to the servers.

As another example, a type of load balancing operation, which can be executed by master 202 comprises a merging of ones of the partitions into a shared partition to be assigned to one of the servers of distributed system 200 (merging operation). For example, assume that servers 204 and 206 each have too many partitions. Partitions P1 and P2 may be merged into a single partition assigned to server 204 or server 206. In this way, at least one of servers 204 and 206 can host a reduced number of partitions. Again, merging of partitions does not require physical movement of data at the storage level. Rather, in various implementations, partitions can be merged by updating the partition map to represent the partitions as a single partition, which is assigned to one of the servers.

Load balancing logic can be utilized in order to coordinate the load balancing operations performed on distributed system 200 so as to achieve one or more optimization goals with respect to load balancing. As one example, master 202 may implement the load balancing logic of distributed system 200 by determining which types of load balancing operations to perform on distributed system 200 in conjunction with determining partitions and servers on which the load balancing operation are performed. By performing a series of these load balancing operations over time, master 202 can adjust the load balance of distributed system 200 in accordance with the one or more optimization goals.

In various implementations, the load balancing logic incorporates a plurality of optimization goals with respect to load balancing. The plurality of optimization goals with respect to load balancing can take many different forms and may concern any of a variety of different aspects of distributed system 200.

One specific example of an optimization goal comprises maintaining resource utilization of any particular server below a threshold value. The resource utilization may be represented as one or more dimensions, which are later described in additional detail. As an example, it may be an optimization goal to maintain CPU utilization (or a different resource) of each of the servers, or a percentage of the servers, or one or more specific servers, of distributed system 200 below 90% of capacity. In this respect, master 202 may select one or more load balancing operations in order to reduce CPU utilization below 90% of capacity for a server that is above 90% CPU utilization.

Another example of an optimization goal comprises spreading resource utilization amongst the servers of a distributed system so that the resource utilization is not overly concentrated on any of the servers. In this respect, master 202 may select one or more load balancing operations in order to reduce resource utilization of any of the servers, while increasing the resource utilization for other servers.

Another example of an optimization goal comprises spreading partitions that belong to a particular account, of a plurality of accounts hosted on a distributed system, amongst the servers of the distributed system so that the partitions are not overly concentrated on any of the servers. In this respect, master 202 may select one or more load balancing operations in order to reduce the concentration of partitions of any of the servers for the particular account, which may increase the concentration on other servers.

In some approaches to load balancing, aspects of load balancing logic corresponding to some optimization goals of a plurality of optimization goals may inform master 202 to select one or more load balancing operations that can diminish the state of distributed system 200 with respect to others of the plurality of optimization goals. This can cause oscillations in the state of distributed system 200, whereby the optimization goals are continuously competing without being able to reach a stable state for distributed system 200.

To illustrate the forgoing, a first optimization goal may inform master 202 to perform a first load balancing operation to move partition P1 from server 204 to server 206 to improve the state of distributed system 200 with respect to spreading partitions that belong to a particular account amongst the servers where partitions P1 and P4 belong to the particular account and partitions P2 and P7 do not belong to the particular account. However, the load balancing operation may simultaneously increase the CPU utilization of server 206 to above 90% thereby diminishing a second optimization goal to maintain resource utilization of any particular server below 90% of capacity.

Subsequently, the second optimization goal may inform master 202 to perform a second load balancing operation to move partition P1 from server 206 to server 204 to improve the state of distributed system 200 with respect to maintaining resource utilization of any particular server below a 90% of capacity. However, the load balancing operation may simultaneously increase the concentration of the partitions belonging to the particular account on server 204 thereby diminishing the first optimization goal. The first and second load balancing operations may be repeated continuously as the first and second optimization goals compete thereby preventing distributed system 200 from reaching a stable state.

In accordance with some implementations of the present disclosure, load balancing logic of distributed system 200 can implement a plurality of optimization goals while avoiding or significantly reducing oscillations that may prevent distributed system 200 from reaching a stable state. Furthermore, optimization goals can easily be added to or removed from the plurality of optimization goals while maintaining these properties for the load balancing logic of distributed system 200.

Figure 3:
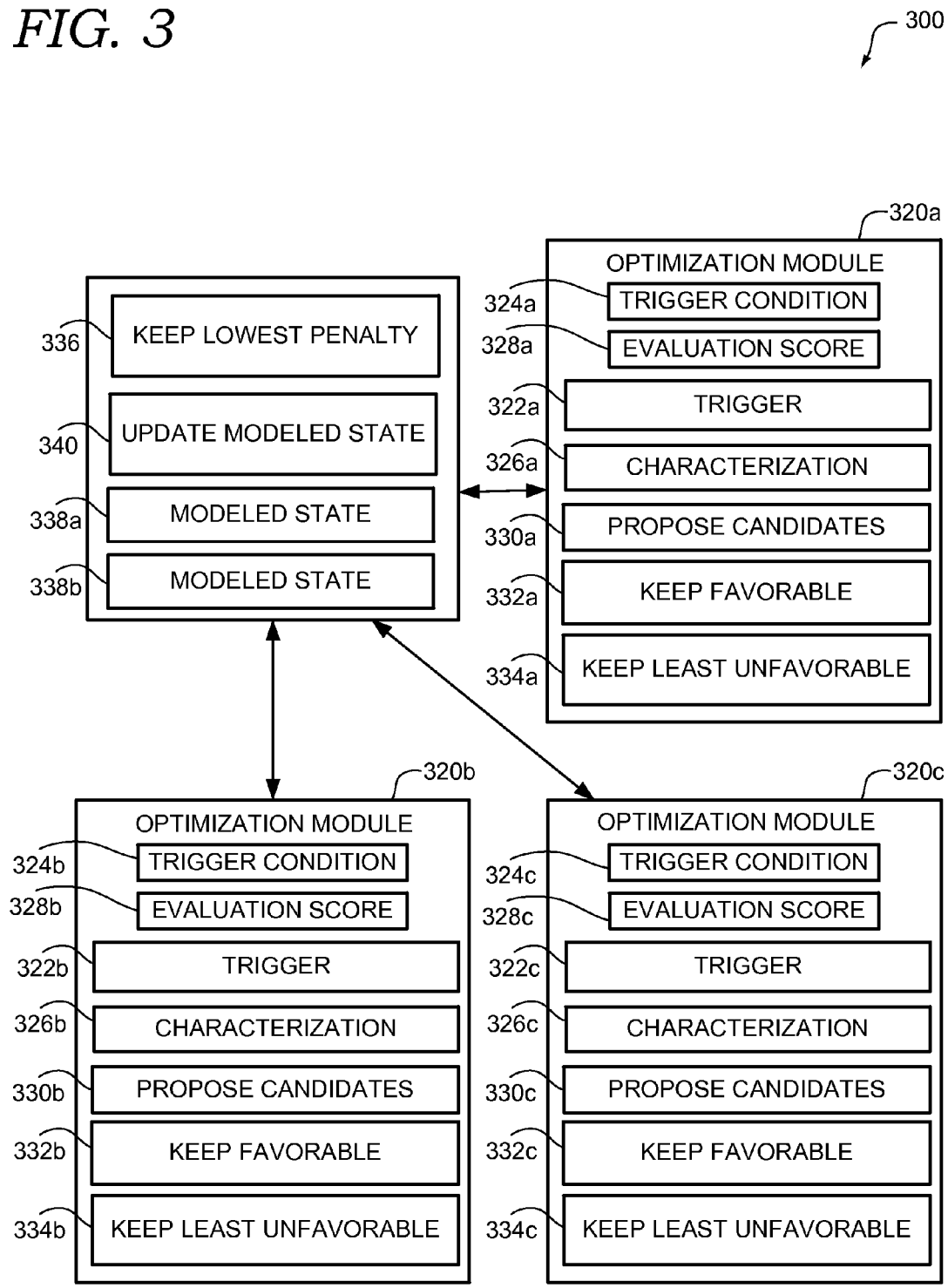
FIG. 3 depicts an exemplary load balancing framework in which implementations of the present disclosure may be employed.

Referring now to FIG. 3, FIG. 3 depicts an exemplary load balancing framework in which implementations of the present disclosure may be employed. Framework 300 can be employed by, for example, master 202 of FIG. 2. Framework 300 includes one or more optimization modules, of which optimization modules 320a, 320b, and 320c are specifically shown. Any of the various constituents of framework 300 can be specific to each optimization module or any portion or portions thereof may be shared. Furthermore, each optimization module of framework 300 can correspond to one of a plurality of optimization goals, which can be carried out utilizing an optimization routine of the optimization module. To this effect, each optimization module can include a trigger condition for the optimization routine and any of various optimization functions for optimization routines.

One or more optimization functions can be utilized by each optimization module in an optimization routine. Examples of optimization functions are shown in FIG. 3, but others can be employed. As shown, optimization module 320a includes optimization functions 322a, 326a, 330a, 332a, and 334a. Optimization modules 320b and 320c are shown as including similar types of optimization functions as optimization module 320a. However, either of optimization modules 320b and 320c can include different types of optimization functions. Furthermore, in various implementations any of the optimization functions can be shared between any of the optimization modules. Examples of shared optimization functions are shown as optimization functions 336 and 340 in FIG. 3, but in various implementations, any of the other optimization functions shown may be shared. Optimization functions are later described in further detail. It is further noted that some optimization functions may be utilized by others, for example, as sub functions. For example, optimization function 326a, which is indicated as a characterization function, may be employed by optimization functions 330a, 322a, 332a, and 334a to, for example characterize one or more load balancing operations.

Each optimization module can have a trigger condition. In response to the trigger condition being met, an optimization routine of the optimization module may be performed. Each optimization module can have a respective trigger condition or some of the trigger conditions can be shared. A trigger function can be utilized to determine whether or not the trigger condition is met. For example, in the implementation shown, optimization module 320a has optimization function 322a, which is a trigger function. Optimization function 322a can be utilized to determine whether trigger condition 324a is met, for example, by returning a true or false, or other indicator. Optimization modules 320b and 320c also have respective optimization functions 322b and 322c and respective trigger conditions 324b and 324c, which can be different than optimization function 322a and trigger condition 324a. As such, in the implementations shown, each optimization module can independently determine whether its corresponding trigger condition is met.

Thus, the trigger condition for one or more of the optimization modules may be met while the trigger condition for one or more others of the optimization modules are concurrently not met. As such, during a given period of time optimization routines may be performed for triggered optimization modules without being performed for other optimization modules. During a later period of time, any of the triggered optimization modules may be different so that different optimization routines are performed as any of various factors used to determine the trigger conditions change. Thus, framework 300 allows for a distributed system, such as distributed system 200, to adapt to various optimization goals over time. Furthermore, optimization modules and corresponding optimization goals can easily and efficiently be added to, removed from, or modified in framework 300.

The trigger condition for any of the optimization modules can be determined by analyzing any of various factors. Exemplary factors described herein may be combined in any suitable manner and in any suitable combination. One exemplary factor comprises a quota. For example, the optimization routine of the optimization module may have an associated quota that determines how many times the optimization routine can be employed, which may be over a given period of time. The quota may increase if other factors of the trigger condition prevent the trigger condition from being met. Additionally the quota may have a cap to limit the number of times the optimization routine can be employed over a given period of time.

Another exemplary factor comprises any of various temporal or time based factors. For example, the trigger condition may be met periodically after a given period of time has elapsed. Yet another exemplary factor may be determined by one or more other optimization modules. For example, the factor may be based on or conditioned on whether or not one or more other optimization routines of the one or more optimization modules have been performed or their trigger conditions have been met. The trigger condition of one optimization module may be met, for example, after the optimization routine of one or more other optimization modules has been performed a given number of times, and potentially over a given period of time. An additional factor may be whether another factor exceeds a threshold value.

Various exemplary factors of the trigger condition for any of the optimization modules can be based on a state of a distributed system that employs framework 300, such as distributed system 200. As one example, any trigger condition can optionally be determined, at least in part, by one or more modeled states of distributed system 200, such as modeled states 338a and 338b. A modeled state can comprise one or more statistics, metrics, and/or other variables related to any of the various constituents of the distributed system, such as those shown in FIG. 2. Modeled states can be determined and managed by, for example, master 202. The variables can be input into, predetermined, or measured or otherwise derived from the distributed system.

Any of the variables can be related to any combination of one or more servers, partitions, masters, clients, applications, or other constituents of the distributed system. At least one of the variables may correspond to the distributed system overall. Limited examples include a total number of servers in the distributed system, and a total number of partitions in the distributed system. At least one of the variables can be expressed in terms of subcomponents of another component of the distributed system. Some examples include a total number of partitions hosted by a particular server, utilization of a particular resource of a particular server, and utilization of a particular resource by a particular partition. In some implementations, the one or more subcomponents are associated with an account of a plurality of accounts hosted by the distributed system. As a few examples, a variable can correspond to partitions or servers that are assigned to or associated with a particular account or resource utilization associated with a particular account. Other exemplary variables can include any of the various variables of evaluation formulas, trigger formulas, and other formulas or functions described herein. It is further noted that any of these function or formulas may derive its variables from the modeled state.

It will therefore be appreciated that the variables that can be incorporated into one or more modeled states can take many different forms and can incorporate many different factors pertaining to the distributed system. By optionally incorporating at least one of those variables into the trigger condition, the trigger condition may be determined by the one or more modeled states. For example, the trigger condition may be determined by a trigger formula, where one to all of the variables of the trigger formula is provided for by the one or more modeled states. The trigger formula can thus provide a trigger score that is calculated from the modeled state of the scalable storage.

A modeled state can correspond to a representation of a state of the distributed system at a given time. A modeled state can correspond to a current or actual state of the distributed system. However, the modeled state may instead correspond to an extrapolated state of the distributed system, for example, that models executing at least one load balancing operation on the distributed system. An extrapolated state of the distributed system can be calculated from or otherwise based on an actual or current state of the distributed system. The extrapolated state can be calculated directly from the actual state or indirectly by being calculated from another extrapolated state, which itself may have been calculated directly from an actual or current state, or from an extrapolated state.

Thus, in some implementations, the trigger condition for any of the optimization modules can be determined based on at least one load balancing operation without necessarily executing the at least one load balancing operation on the distributed system. This can be utilized in some implementations of the present disclosure where an iterative approach to load balancing is desired.

Each optimization module can also be configured to generate an evaluation score. The evaluation score quantifies a modeled state of the distributed system with respect to the optimization goal of its corresponding optimization module. For example, evaluation score 328a can quantify modeled state 338a or 338b with respect to optimization module 320a. By quantifying the modeled state of the distributed system, the evaluation score provides a means for comparing one modeled state of the distributed system to another modeled state of the distributed system (e.g. modeled state 338a to modeled state 338b). In this way, the evaluation score can be utilized to determine or characterize whether one modeled state is an improvement to the modeled state, is a diminishment of the modeled state, or is substantially equivalent to the modeled state with respect to the optimization goal of the optimization module.

An evaluation score may change in one direction (e.g. a positive direction) from one modeled state to another to indicate improvement between the modeled states with respect to an optimization goal. Furthermore, the evaluation score may change in the other direction (e.g. an opposite, negative direction) from one modeled state to another to indicate diminishment between the modeled states with respect to the optimization goal. Also, the evaluation score may stay the same or substantially the same to indicate substantial equivalence between modeled states with respect to the optimization goal. Therefore, the evaluation score can be utilized to determine or characterize whether one modeled state is better or worse than another with respect to the optimization goal, and potentially by how much. Theses determinations or characterizations may be carried out utilizing a characterization function, which is described in additional detail below.

An evaluation score can be determined by an evaluation formula or function, which quantifies an optimization goal of an optimization module. As the optimization modules can each have different evaluation formulas, the optimization modules can correspond to different optimization goals. For example, evaluation scores 328a, 328b, and 328c can quantify a modeled state of the distributed system with respect to different optimization goals. Therefore, the same modeled state may be evaluated with respect to different optimization goals for different optimization modules. As with a trigger formula, and other formulas described herein, one to all of the variables of the evaluation formula can be provided for by the modeled state, such as modeled state 338a or 338b. Thus, the evaluation score can be determined, at least in part, by the modeled state. For an optimization module, a trigger formula may be utilized as the evaluation formula, or the evaluation formula can be different than the trigger formula.

The characterization of a modeled state of scalable storage may be carried out by a characterization function, such as any of characterization functions 326a, 326b, and 326c. A characterization function can return a characterization value corresponding to the change or the amount of the change in the evaluation score between one modeled state and another, as described above. As an example, the one modeled state can correspond to the distributed system prior to performing at least one load balancing operation and the another modeled state can correspond to an extrapolated state of the distributed system that models executing the at least one load balancing operation on the distributed system.

In this way, the characterization function can characterize the at least one load balancing operation with respect to an optimization goal of an optimization module. For example, a characterization function can indicate whether the at least one load balancing operation would improve, diminish, or substantially maintain the modeled state of the distributed system based on a change, or lack thereof, in the evaluation score that would be caused by performing the at least one load balancing operation on the modeled state. Furthermore, a characterization function can be utilized by any of the various optimization functions of an optimization routine in order to evaluate load balancing operations with respect to one another (e.g. by comparing respective characterization values).

A propose candidates function is another example of an optimization function which can be employed in framework 300. The propose candidates function can be part of an optimization routine of an optimization module. As shown, optimization modules 320a, 320b, and 320c include respective optimization functions 330a, 330b, and 330c, which can be respective propose candidates functions. However, like other optimization functions, a propose candidates function can be shared and need not be specific to a particular optimization module.

The propose candidates function can be configured to identify, select, and/or provide a plurality of candidate operations, where the plurality of candidate operations are potential load balancing operations associated with partitions assigned to servers of the distributed system. The plurality of candidate operations that are identified, provided and/or selected by a propose candidates function can be utilized as an initial set of load balancing operations, which may be narrowed by other optimization functions. At least one load balancing operation can be selected by an optimization routine from the plurality of candidate operations.

A propose candidates function can identify, select, and/or provide a group of any combination of movement, splitting, merging, or other load balancing operations. In some implementations, the plurality of candidate operations may all be of the same type, such as all movement operations or all splitting operations, but this need not be the case. Each load balancing operation can be provided by the propose candidates function while identifying one or more partitions and one or more servers associated with the load balancing operation. As one specific example, in some implementations, a movement load balancing operation is identified by a tuple of two elements: <partition, target server>.

One example of a propose candidates function provides all potential load balancing operations that are associated with partitions assigned to servers of the distributed system. However, other examples may provide a portion of all potential load balancing operations, such as all potential load balancing operations of a particular type, or a different subset. A propose candidates function may employ one or more heuristics to select the plurality of candidate operations. The one or more heuristics may be designed to increase the chance that the best load balancing operations are selected for improving the state of the distributed system with respect to an optimization goal of an optimization routine. Therefore, the one or more heuristics can be different with respect to different propose candidates functions and may be tailored to one or more particular optimization goals. A propose candidates function can select the plurality of candidate operations as determined by or based on a trigger formula, an evaluation score, and/or other formulas or functions, which may be incorporated into the heuristics.

A keep favorable function is another example of an optimization function which can be employed in framework 300. The keep favorable function can also be part of an optimization routine of an optimization module. As shown, optimization modules 320a, 320b, and 320c include respective optimization functions 332a, 332b, and 332c, which can be respective keep favorable functions. However, like other optimization functions, a keep favorable function can be shared and need not be specific to a particular optimization module.

A keep favorable function can be configured to filter a set of candidate operations based on an optimization goal of an optimization module, for example, to keep favorable candidate operations with respect to the optimization goal of the optimization module. The input can be a set (e.g. a list) of candidate operations, for example, as provided from a propose candidates function, and the output can be a smaller set that comprises the best or close to best operation(s) as quantified by an evaluation score of an optimization module (e.g. of the optimization module that comprises the function). It is noted that the set of candidate operations may have been filtered or otherwise modified before being provided to the keep favorable function, for example by another optimization function of framework 300.

A favorable candidate operation can correspond to a load balancing operation that improves the modeled state of the distributed system as quantified by an evaluation score and characterized by a characterization function (e.g. a characterization value provided therefrom). A candidate operation having a greater improvement than another can be considered better or more favorable than another having a lesser improvement to the modeled state of the distributed system, as indicated by characterization values. In some implementations, the keep favorable function comprises filtering out ones of the plurality of candidate operations that would diminish or substantially maintain the modeled state of the distributed system, as indicated by the characterization value.

In some implementations, a keep favorable function comprises selecting one or more operations corresponding to a percentage, designated number, or range of the plurality of candidate operations input therein that would improve the modeled state of the scalable storage the most as quantified by an evaluation score of a triggered or other optimization module. For example, the keep favorable function may retain candidate operations that would provide, for example, approximately 90% or greater improvement as compared to the improvement of the best candidate operation (e.g. most favorable operation) in the plurality of candidate operations. Thus, if the best candidate operation had a characterization value of 1.0, all candidate operations having characterization values from 0.9 to 1.0 may be retained or selected by the keep favorable function, as one example.

A keep favorable function can be utilized, for example, to provide flexibility to an optimization routine. For example, the optimization routine for an optimization module can be greedy in that it may determine what is best for its optimization goal while disregarding others. Maintaining a group of candidate operations that are favorable for the optimization goal is one approach to making the optimization routine less greedy. For example, other optimization goals of other optimization modules can be considered by having multiple favorable load balancing operations that may be selected from by the optimization routine. This may be implemented, for example, by providing a keep least unfavorable function that corresponds to at least one other optimization module.

A keep least unfavorable function is another example of an optimization function which can be employed in framework 300. The keep least unfavorable function can also be part of an optimization routine of an optimization module. As shown, optimization modules 320a, 320b, and 320c include respective optimization functions 334a, 334b, and 334c, which can be respective keep least unfavorable functions. However, like other optimization functions, a keep least unfavorable function can be shared and need not be specific to a particular optimization module.

A keep least unfavorable function can be configured to filter a set of candidate operations to keep the least unfavorable candidate operations with respect to an optimization goal of an optimization module (e.g. by an optimization routine from a different optimization module than the optimization module). The input can be a set (e.g. a list) of candidate operations, for example, as provided from a propose candidates function and the output can be a smaller set that comprises the least worst or close to being the least worst operation(s) as quantified by an evaluation score of an optimization module. It is noted that the set of candidate operations may have been filtered or otherwise modified prior to being provided to the keep least unfavorable function, for example by another optimization function of framework 300.

An unfavorable candidate operation can correspond to a load balancing operation that diminishes the state of the distributed system as quantified by an evaluation score and characterized by a characterization function (e.g. a characterization value of the characterization function). A candidate operation having a greater diminishment can be considered worse or more unfavorable than another having a lesser diminishment to the state of the distributed system, as indicated by characterization values. In some implementations, the keep least unfavorable function determines and retains ones of the plurality of candidate operations that would improve the state of the distributed system, as indicated by the characterization value.

In some implementations, the keep least unfavorable function retains at least one unfavorable operation, such as one or more least unfavorable operations of the unfavorable operations. In this respect, the least unfavorable operations can be considered the best of the worst operations for an optimization goal from the input set of candidate operations. The keep least unfavorable function may retain at least one unfavorable operation conditioned upon no favorable operation(s) being included in the input set of candidate operations or the at least one unfavorable operation may be retained regardless. In various implementations, the keep least unfavorable function may always output as least one candidate operation from the input set of candidate operations. One example of a keep least unfavorable function comprises selecting one or more operations corresponding to a percentage, designated number, or range of the input set of candidate operations that would diminish the modeled state of the scalable storage the least as quantified by an evaluation score of an optimization module.

As described above, an optimization routine that maintains a group of candidate operations that are favorable for the optimization goal of its triggered optimization module is one approach to making the optimization routine of the triggered optimization module less greedy. For example, the group of candidate operations can be filtered in accordance with other optimization goals of other optimization modules prior to selecting at least one operation for the optimization routine. The optimization routine of the triggered optimization module can filter the group of candidate operations utilizing a keep least unfavorable function or other function that corresponds to one or more other optimization modules. As such, the group of candidate operations may be filtered in accordance with other optimization goals of other optimization modules by utilizing keep least unfavorable functions of those optimization modules. Where the keep least unfavorable functions retain at least one candidate operation, the optimization routine can still have at least one candidate operation to be selection. Furthermore, by performing a keep favorable function of its optimization module prior to performing keep least unfavorable operations of other optimization modules, the at least one candidate operations can always be favorable to the optimization goal of the optimization routine.

A keep lowest penalty function is another example of an optimization function which can be employed in framework 300. The keep lowest penalty function can also be part of an optimization routine of an optimization module. As shown, framework 300 includes optimization function 336, which can be a keep lowest penalty function. Like other optimization functions, a keep lowest penalty function can be shared or can be specific to a particular optimization module.

A keep lowest penalty function or other penalty function can be configured to filter out one or more candidate operations based on a penalty or penalties associated with executing the one or more of candidate operations on the scalable storage. A penalty can correspond to a cost associated with performing a load balancing operation of the distributed system. For example, a penalty can correspond to time, resource utilization, and/or other factors associated with performing a load balancing operation on the distributed system.

In some implementations, the penalty is based on live traffic of an associated partition or partitions. Higher live traffic can correspond to a higher penalty and/or cost than lower live traffic. Brackets can be defined for the live traffic, so that multiple partitions fall into each bracket. Each bracket can correspond to a different penalty for performing a load balancing operation on those partitions so that partitions within the same bracket have the same associated penalties. As one example, the live traffic may be considered as a request rate where a request rate between 0 and 10 delineates one bracket, between 10 and 100 delineates another bracket, between 100 and 1000 delineates another bracket, and so on. As can be seen the bracket bounds increase for higher ranges of request rates.

A penalty may be calculated as a penalty score, for example by master 202, or can be predetermined or otherwise evaluated. In some implementations, the penalty is derived from other load balancing operations, for example similar load balancing operations, which have been previously executed in the distributed system. As one example, master 202 may measure penalties for executing load balancing operations and determine the penalty based on the measured penalties, such as by an average thereof. Various processes for determining and/or evaluating penalties can be reconfigurable. For example, it may be desirable to override or alter consideration of penalties when an account, the overall system, or other portions of the distributed system is at risk of or is experiencing high latency.

In some implementations, the penalty for a load balancing operation can be determined based on one or more partitions associated with the load balancing operation. For example, partitions may be classified into classes that tend to cause similar costs to be incurred when a load balancing operation is performed thereon. The penalty can be based on or determined by factoring in these classes. A class for a partition can be based on, for example, the partition's associated applications or other processes in the distributed system (e.g. which applications or other operations the partition is assigned to). Partitions associated with system processes may have higher associated penalties than those associated with an account (e.g. user account) or general storage.

In some implementations, a penalty for a candidate operation is based on whether any of the partitions associated with the candidate operation have on-going garbage collection (GC) or other long running background activities which may be negatively affected by the candidate operation.

Also in some implementations, a penalty for a candidate operation is based on whether any of the partitions associated with the candidate operation are associated with or assigned to infrastructure as a service (IAAS) processes of the distributed system. IAAS processes can allow users to outsource equipment including storage, hardware, servers and networking components to the distributed system. The IAAS processes can manage accounts of these users as well as any associated virtual machines, virtual networking, and storage.

In some implementations, a penalty for a candidate operation is based on whether any of the partitions associated with the candidate operation are associated with or assigned to a system table of the distributed system. A system table can comprise storage related to implementing a data storage and management system, which can be a subcomponent of the distributed system. As one example, the system table can comprise information schema views, partition map information, and other critical system metadata.

Partitions associated with GC, system table, and IAAS processes typically have higher associated penalties than other partitions when involved in a load balancing operation. Associated penalties from lowest to highest can be partitions associated with GC, followed by the IAAS, and the system table. This can be reflected in corresponding penalties of load balancing operations and can be factored into a keep lowest penalty function or another function that factors in penalties.

A keep lowest penalty function can be configured to filter a set of candidate operations to keep the candidate operations that have the lowest penalty to the distributed system. The input can be a set (e.g. a list) of candidate operations, for example, as provided from a propose candidates function and the output can be a smaller set that comprises the least worst or close to being the least worst operation(s) in terms of associated penalties. It is noted that the set of candidate operations may have been filtered or otherwise modified prior to being received by the keep lowest penalty function, for example by another optimization function of framework 300. Furthermore, the keep lowest penalty function may optionally be a subfunction of a propose candidates function or other optimization function.

One example of a keep lowest penalty function comprises selecting one or more operations corresponding to a percentage, designated number, or range of the input set of candidate operations that have the lowest associated penalties. Selecting a group of candidate operations that have the lowest penalties is one approach that allows an optimization routine of an optimization module to factor penalties into selecting at least one load balancing operation for the optimization routine.

An update modeled state function is another example of an optimization function which can be employed in framework 300. The update modeled state function can also be part of an optimization routine of an optimization module. As shown, framework 300 includes optimization function 340, which can be an update modeled state function. Like other optimization functions, an update modeled state function can be shared or can be specific to a particular optimization module.

An update modeled state function can be configured to update a modeled state of the distributed system, such as modeled states 338a and 338b. An update modeled state function can be configured to receive a modeled state as input and to output an updated modeled state. Updating a modeled state can comprise updating the one or more statistics, metrics, and/or other variables of the modeled state to reflect executing at least one load balancing operation. One to all of the variables in the updated modeled state may be calculated from one to all of the variables in the modeled state.

The updated modeled state can correspond to a current or actual state of the distributed system. However, the modeled state may instead correspond to an extrapolated state of the distributed system, for example, that models executing the at least one load balancing operation on the distributed system. The extrapolated state can optionally be utilized as a modeled state later input into an update model function. In this way, framework 300 allows for simulating execution of at least one load balancing operation, which may optionally be performed iteratively as additional load balancing operations are selected and/or considered for execution by one or more optimization routines.

Figure 4:
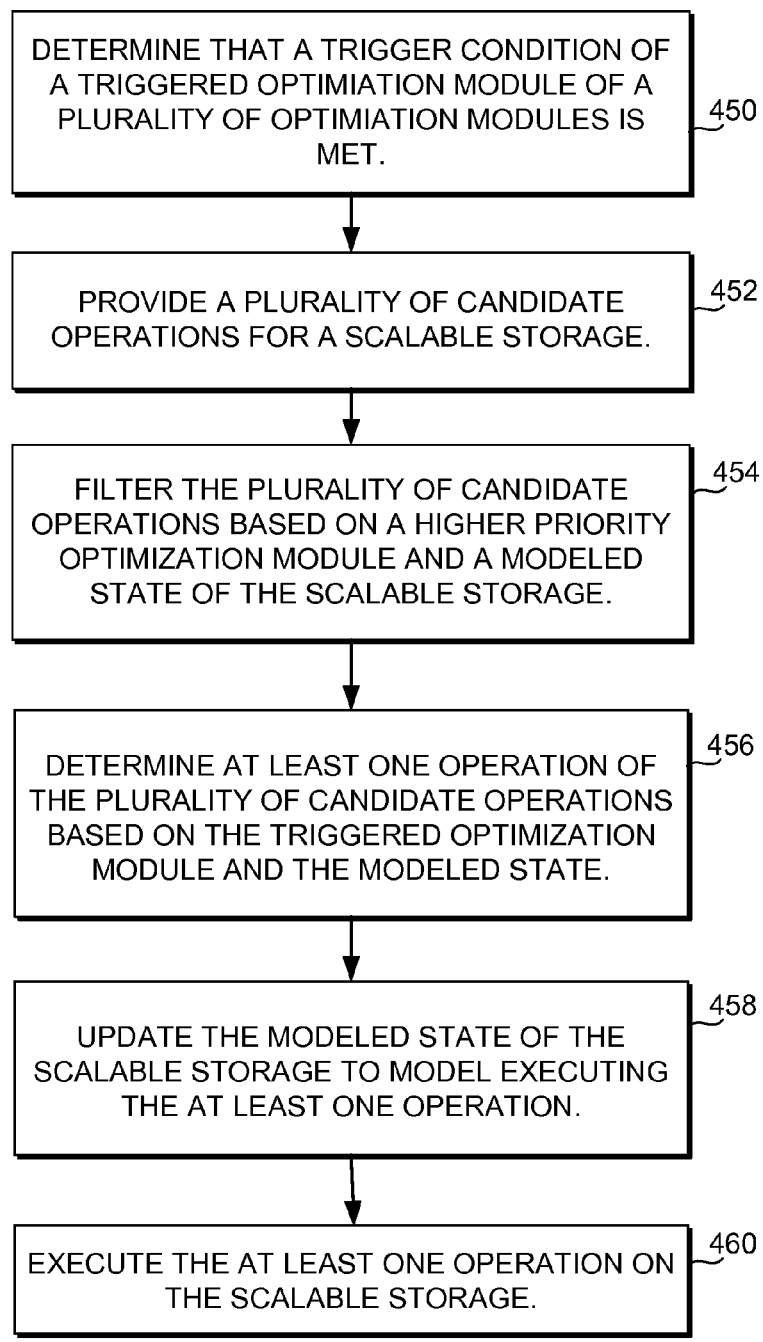
FIG. 4 depicts a flow diagram of an exemplary method for load balancing a scalable storage in accordance with implementations of the present disclosure.

Referring now to FIG. 4, FIG. 4 depicts a flow diagram of an exemplary method for load balancing a scalable storage in accordance with implementations of the present disclosure. In particular, FIG. 4 depicts a flow diagram of method 400, in accordance with implementations of the present disclosure. Method 400 is described below with respect to FIG. 2 and FIG. 3, for illustrative purposes only. However, method 400 is not limited to particular features of distributed system 200 and framework 300 described herein. Furthermore, what is shown in FIG. 4 should not necessarily be considered comprehensive with respect to method 400 in that certain procedures may be omitted or additional procedures may be employed. Also, certain orderings of those procedures indicated by FIG. 4 should not be considered limiting and may be altered in certain implementations of the present disclosure.

Method 400 includes determining that a trigger condition of a triggered optimization module of a plurality of optimization modules is met (450 in FIG. 4). For example, trigger function 322b can determine that trigger condition 322b of optimization module 320b of optimization modules 320a, 320b, and 320c is met. In response to determining that trigger condition 332b is met, trigger function 322b can provide an indicator, such as a true value. Determining that trigger condition 332b of optimization module 330b is met can be based on modeled state 338a. For example, any of various variables in modeled state 338a may be plugged into corresponding variables of a trigger formula of trigger condition 332b. The trigger condition may be determined as met by comparing a result of the trigger formula (e.g. a trigger score) to a threshold value. For example, the trigger condition may be met based on the trigger score exceeding the threshold value.

Method 400 can also include optimizing the scalable storage based on an optimization routine (not specifically shown in FIG. 4). For example, distributed system 200 can be optimized based on an optimization routine of optimization module 320b. The optimization routine of the triggered optimization module may be performed in response to determining that the trigger condition of the triggered optimization module of the plurality of optimization modules is met. Furthermore, the optimization routine may comprise 452, 454, 456, and 458 of method 400, described further below.

Method 400 further includes providing a plurality of candidate operations, where the plurality of candidate operations are potential load balancing operations associated with partitions assigned to servers of the scalable storage (452 in FIG. 4). For example, propose candidates function 330b of optimization module 320b can provide a plurality of candidate operations, where the plurality of candidate operations are potential load balancing operations associated with partitions (e.g. partitions P1, P2, P3, P4, P5, and P6) assigned to servers (e.g. servers 204, 206, 208, and 210) of distributed system 200.

Method 400 also includes filtering the plurality of candidate operations based on a higher priority optimization module and a modeled state of the scalable storage (454 in FIG. 4). For example, master 202 may utilize characterization function 326a of optimization module 320a, which has a higher priority than optimization module 320b, and/or another characterization function of another higher priority optimization module (not shown) to filter the plurality of candidate operations based on modeled state 338a.

Filtering the plurality of candidate operations based on the higher priority optimization module and the modeled state of the scalable storage can comprise, for a selected optimization module of the plurality of optimization modules that has a higher priority than the triggered optimization module, removing a candidate operation from the plurality of candidate operations that would diminish a modeled state of the scalable storage as quantified by an evaluation score of the selected optimization module. For example, characterization function 326a of optimization module 320a may provide a characterization value that indicates that a candidate operation from the plurality of candidate operations would diminish modeled state 338a of distributed system 200 as quantified by evaluation score 328a of optimization module 320a. The candidate operation may then be removed from the plurality of candidate operations.

Filtering the plurality of candidate operations based on a higher priority optimization module and a modeled state of the scalable storage allows for candidate operations to be removed from the plurality of candidate operations that may diminish an optimization goal of the higher priority optimization module. This can be utilized to impose a hierarchy on the optimization goals of the optimization modules. In this way, oscillations in the state of distributed system 200 can be reduced or eliminated by reducing competition between the optimization goals.

In some implementations, for the selected optimization module of the plurality of optimization modules that has the higher priority than the triggered optimization module, each candidate operation is removed from the plurality of candidate operations that would diminish a modeled state of the scalable storage as quantified by an evaluation score of the selected optimization module. This may be performed such that the plurality of candidate operations no longer contain any load balancing operation that may diminish the optimization goal of the higher priority optimization module, as quantified by the evaluation score.

Additionally, 454 of method 400 can be performed for each optimization module having a higher priority than the triggered optimization module in framework 300. Method 400 can comprise for each optimization module of the plurality of optimization modules that has a higher priority than the triggered optimization module, removing all candidate operations from the plurality of candidate operations that would diminish a modeled state of the scalable storage as quantified by an evaluation score of the optimization module. Doing so can impose a hierarchy on the load balancing logic such that the various optimization goals of the optimization modules converge and distributed system 200 can reach a stable state.

It is noted that if no candidate operation remains in the plurality of candidate operations, an optimization routine for a triggered optimization module may terminate without selecting a candidate operation.

Method 400 additionally includes determining at least one operation of the plurality of operations based on the triggered optimization module and the modeled state (456 in FIG. 4). For example, at least one operation (e.g. a single operation) of the plurality of operations can be determined based on optimization module 320b and modeled state 338a. This can comprise determining at least one operation of the plurality of candidate operations that would improve the modeled state of the scalable storage as quantified by an evaluation score of the triggered optimization module. For example, the at least one operation of the plurality of candidate operations can be determined that would improve modeled state 338a of distributed system 200 as quantified by evaluation score 328b of optimization module 320b.

In some implementations, determining at least one operation of the plurality of candidate operations that would improve the modeled state of the scalable storage as quantified by an evaluation score of the triggered optimization module is based on one or more characterization values from a characterization function of the triggered optimization module. For example, a characterization value can be generated by optimization function 326b (i.e. a characterization function) for any or all of the plurality of operations, and one or more of the best candidate operations (e.g. having the best characterization values) can be selected from the plurality of operations as the at least one operation.

Also, in some implementations, determining at least one operation of the plurality of candidate operations that would improve the modeled state of the scalable storage as quantified by an evaluation score of the triggered optimization module comprises filtering the plurality of candidate operations based on the triggered optimization module. For example, the plurality of candidate operations may be filtered by optimization function 332b (i.e. a keep favorable function) or another function to remove one to all unfavorable candidate operations with respect to evaluation score 328b from the plurality of candidate operations. Optimization function 332b may filter the plurality of candidate operations so that only favorable operations remain. The at least one operation can thereby be selected by the optimization routine from or as the filtered plurality of candidate operations.

Thus, if only one of the plurality of candidate operations remain after the filtering based on the triggered optimization module, that candidate operation may be selected as the at least one candidate operation by the optimization routine. If multiple ones of the plurality of candidate operations remain after the filtering, those candidate operations may be selected as the at least one candidate operation by the optimization routine. Alternatively, those candidate operations can be filtered further in selecting the at least one candidate operation.

In some implementations, prior to selecting the at least one operation of the plurality of candidate operations, at least one of the plurality of candidate operations is filtered out of the plurality of candidate operations based on a penalty associated with performing the at least one of the plurality of candidate operations on the scalable storage. For example, optimization function 336 (i.e. a keep lowest penalty) or another penalty function can be employed.

Also in some implementations, prior to selecting the at least one operation of the plurality of candidate operations, the plurality of candidate operations are filtered based on at least one lower priority optimization module and the modeled state of the scalable storage. For example, master 202 may utilize characterization function 326c of optimization module 320c, which has a lower priority than optimization module 320b, and/or another characterization function of another lower priority optimization module (not shown) to filter the plurality of candidate operations based on modeled state 338a with respect to the lower priority optimization module.

Filtering the plurality of candidate operations based on the lower priority optimization module and the modeled state of the scalable storage can comprise, for a selected optimization module of the plurality of optimization modules that has a lower priority than the triggered optimization module, removing a candidate operation from the plurality of candidate operations that would diminish a modeled state of the scalable storage as quantified by an evaluation score of the selected optimization module. For example, characterization function 326c of optimization module 320c may provide a characterization value that characterizes that a candidate operation from the plurality of candidate operations would diminish modeled state 338a of distributed system 200 as quantified by evaluation score 328c of optimization module 320c. The candidate operation may then be removed from the plurality of candidate operations.

As another example, filtering the plurality of candidate operations based on a lower priority optimization module and a modeled state of the scalable storage can utilize optimization function 334c (i.e. a keep least unfavorable function) or another function. Filtering the plurality of candidate operations based on a lower priority optimization module and a modeled state of the scalable storage allows the optimization routine of a triggered optimization module to consider one or more lower priority optimization modules, therefore resulting in a less greedy section of the at least one candidate operation by the optimization routine.

In various implementations, filtering the plurality of candidate operations based on at least one lower priority optimization module and a modeled state of the scalable storage is performed while ensuring that not all candidate operations are filtered out of the plurality of candidate operations. In particular, it may be ensured that at least one of the plurality of candidate operations still exists that would improve the state of the scalable storage as quantified by the evaluation score of the triggered optimization module. This can ensure that the optimization routine of the triggered optimization module always has the at least one operation to select for execution on the distributed system.

Method 400 also includes updating the modeled state of the scalable storage to model executing the at least one operation on the scalable storage (458 in FIG. 4). For example, modeled state 338a can be updated to model executing the at least one operation of distributed system 200. This can comprise utilizing optimization function 340 (i.e. an update modeled state function).

The updated modeled state can be utilized to select one or more additional operations to be executed on the scalable storage. For example, the optimization routine of the triggered optimization module can optionally be repeated in response to the trigger condition still being met as determined by the updated modeled state of the scalable storage. In some implementations, the optimization routine is repeated until the trigger condition is no longer met, which optionally can be after the optimization routine has been performed a predetermined number of times.

Also, one or more other optimization routines of one or more other triggered optimization modules can optionally be performed in response to trigger conditions of the one or more other triggered optimization modules. The one or more other optimization routines can be similar to or different than the optimization routine described with respect to optimization module 320b, with corresponding optimization modules being utilized as the triggered optimization module. Those one or more other optimization routines can utilize the updated modeled state and each can update that modeled state similar to the optimization routine of optimization module 320b.

Method 400 also includes executing the at least one operation on the scalable storage (460 in FIG. 4). For example, the at least one operation, which was determined and selected in the optimization routine of optimization module 320b can be executed on distributed system 200. In various implementations, the at least one operation can be executed any time after being determined. As one example, the at least one operation can be executed prior to repeating the optimization routine of the triggered optimization module. The executing the at least one operation and/or the set of proposed operations can be in response to the trigger condition of the triggered optimization module no longer being met.

In some implementations, the optimization routine comprises adding the at least one operation to a set of proposed operations. The set of proposed operations may later be executed on the scalable storage. The set of proposed operations can iteratively grow as one or more additional optimization routines of any of the plurality of optimization modules determine and select at least one operation, which can be added to the set of proposed operations.

It is therefore noted that other optimization routine(s) can be performed prior to the executing the at least one operation that was selected by the triggered optimization module (i.e. optimization module 320b in the current example). Furthermore, the set of proposed operations that are executed can include at least one operation that was selected by the other optimization routine(s). Thus, executing the at least one operation on the scalable storage can comprise executing the set of proposed operations on the scalable storage, which includes the at least one operation that was determined and selected by optimization module 320b.

In various implementations, the optimization routine for each triggered optimization module of the plurality of optimization modules is in response to a respective trigger condition of the triggered optimization module being met. Furthermore, the executing the at least one operation and/or the set of proposed operations can be in response to each or some of the respective trigger conditions no longer being met.

From the forgoing, it will be appreciated that method 400 can be utilized for any of the various optimization modules in framework 300. It will further be appreciated that method 400 can form the basis of more complex methods, which may include one or more instances of method 400 as a subcomponent thereof. One specific example is shown in FIG. 5, which depicts a flow diagram of an exemplary method for load balancing a scalable storage in accordance with implementations of the present disclosure.

Figure 5:
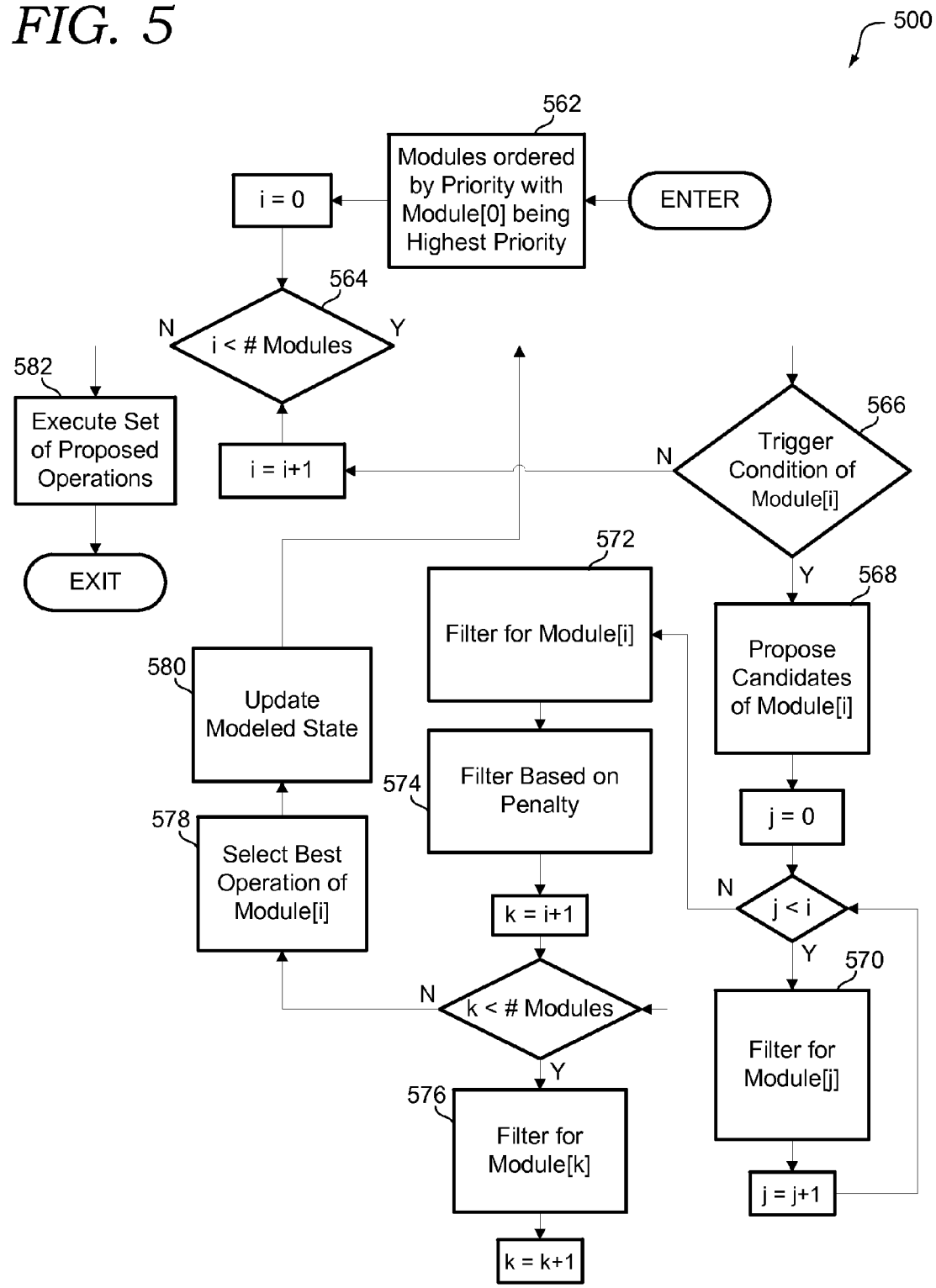
FIG. 5 depicts a flow diagram of an exemplary method for load balancing a scalable storage in accordance with implementations of the present disclosure.

FIG. 5 shows method 500, which begins with receiving list of optimization modules that are ordered by priority (562 in FIG. 5). The list ranges from Module[0] to Module[# Modules], with each integer value corresponding to a respective optimization module. Module[0] of the list is the highest priority optimization module, with the priority of a respective optimization module decreasing as its corresponding integer value increases. Thus, Module[# Modules] corresponds to the optimization module having the lowest priority. It will be appreciated that the list could instead be ordered from lowest priority to highest priority with method 500 being adjusted accordingly.

Method 500 begins with the highest priority optimization module (i.e. module[0]) at 564, and ends after iterating through the list in order of priority. The optimization module corresponding to Module[i] can be referred to as the triggered optimization module where its trigger condition is met. If the trigger function of the optimization module that corresponds to Module[i] is not met at 566, 564 evaluates whether there is a lower priority optimization module remaining in the list. If the trigger function of the triggered optimization module is met at 566, the propose candidates function of the triggered optimization module is performed to select a plurality of candidate operations.

Furthermore, the keep favorable function is performed at 570 on the plurality of candidate operations for all higher priority optimization modules than the triggered optimization module. For example, as can be seen Module[j] will always have a higher priority than Module[i] (i.e. the triggered optimization module) due to the list of optimization modules being ordered by priority. Thus, when j is made equal to i in method 500, any candidate operation(s) that would diminish the state of the scalable storage as quantified by respective evaluation scores of each higher priority optimization module may be removed from the plurality of candidate operations. If no candidate operations remain in the plurality of candidate operations, i may be incremented and method 500 may return to 564.

At 572, the keep favorable function of the triggered optimization module is performed. Thus, any candidate operation(s) that would diminish the state of the scalable storage as quantified by the evaluation score of the triggered optimization module may be removed from the plurality of candidate operations. If no candidate operations remain in the plurality of candidate operations, i may be incremented and method 500 may return to 564.

At 574, the keep lowest penalty function is performed. Thus, at least one of the plurality of candidate operations that has the highest moving penalty may be removed from the plurality of candidate operations.

At 574, the keep lowest penalty function is performed. Thus, at least one of the plurality of candidate operations that has the highest penalty may be removed from the plurality of candidate operations.

The keep least unfavorable function is performed at 576 on the plurality of candidate operations for all lower priority optimization modules than the triggered optimization module. For example, as can be seen Module[k] will always have a lower priority than Module[i] (i.e. the triggered optimization module) due to the list of optimization modules being ordered by priority. Thus, each lower priority optimization module may remove all candidate operations from the plurality of candidate operations while retaining the least unfavorable operations for the lower priority optimization module. Each keep least unfavorable function may be configured to retain at least one candidate operation, such that when k is made equal to i in method 500, the plurality of candidate operations still include at least one operation. Furthermore, due to the keep favorable function at 572, the at least one operation will be favorable to the triggered optimization module.

At 578, the best operation of the plurality of candidate operations is selected and added to a set of proposed operations. At 580, the modeled state utilized by the optimization routine of the triggered optimization module is updated by the update modeled state function. Subsequently, the trigger condition for the triggered optimization module can be evaluated based on the updated modeled state at 566, and various portions of method 500 can repeat to select another best operation and add that best operation to the set of proposed operations. When the trigger condition is no longer met for the triggered optimization module, a different optimization module can become the triggered optimization module, which can result in at least one best operation for the different optimization module being added to the set of proposed operations. This can be repeated for each optimization module, as shown. At 582, the set of proposed operations, if present, is executed on the scalable storage.

Having described various methods, in accordance with implementations of the present disclosure, additional exemplary optimization modules are described below, that may be implemented in methods of the present disclosure. It is noted that features and functions described below are not necessarily specific to a particular type of optimization module or a specific optimization goal.

Dimensional Load Balancing

One approach to load balancing logic of scalable storage only considers live traffic, which is expressed in terms of request rate and latency. However, considering only live traffic can be insufficient for implementing effective load balancing. For example, different, often orthogonal, resources of scalable storage have become increasingly prone to constraint that may not be adequately addressed by load balancing logic that only considers live traffic. This may be due, in part to an increasing number of different request types, and an increasing number of small or large background jobs performed on partitions of scalable storage. An example of a background job is replication of data, where data stored by partitions can be replicated to another location. For example, geo-replication may be employed in geographically distributed scalable storage. Other examples include erasure coding to protect data from storage failure, and data verification. As a result, resource demand of the partitions may often be unproportional to live traffic.

In accordance with implementations of the present disclosure, load balancing logic can consider multiple resources of the scalable storage utilizing one or more dimensions. Each dimension can correspond to one or more resources of the scalable storage. Each of the one or more resources can be a measurable and definable quantity of the scalable storage. Examples of resources that can be considered by the load balancing logic include CPU processing, live traffic volume, network bandwidth, partition count, partition size, and many more.

Any to all of the dimensions employed by the load balancing logic can be defined in terms of one or more metrics that quantify the one or more resources of the dimension. The one or more metrics that define a particular dimension can be selected from a plurality of metrics, which are provided for in load balancing logic. By selecting the one or more metrics from the plurality of metrics for a dimension, the dimension can be easily and efficiently be added to, removed from, or modified for the load balancing logic. Furthermore, corresponding metrics can be compared between different dimensions.

Each metric can quantify utilization of one or more resources of a dimension with respect to any combination of one or more servers and/or partitions of the scalable storage. An example of one such metric is a partition metric. The partition metric can quantify the utilization of the one or more resources of the dimension with respect to one or more partitions (e.g. a single partition). For example, where the one or more resources comprises a CPU resource, the partition metric can quantify the utilization of the CPU resource that is associated with a single partition. A dimension may include a partition metric for each of a plurality of partitions.

In some implementations, the partition metric is substantially independent from the server or servers to which the one or more partitions is assigned. Thus, for example, the partition metric may not substantially change in value due to a load balancing operation that assigns the partition to a different server. CPU utilization is one example of a partition metric that is substantially independent from the server or servers to which the one or more partitions is assigned. A counter example can be throttling, in which a partition may be throttled on an old server, but not on a new server, where the throttling is based on server load, which is specific to a server.

Another example of a metric is a process metric. The process metric can quantify utilization of the one or more resources of the dimension with respect to partitions that are assigned to a server (e.g. each partition that is assigned to the server). In some implementations, the process metric comprises a sum of the partition metrics for each partition that is assigned to the server. Another example of a metric is a server metric. The server metric can quantify overall utilization of the one or more resources of the dimension with respect to the server. In some implementations, the server metric corresponds to the process metric plus additional utilization of the one or more resources of the dimension that is associated with overhead on the server. A dimension can include a process metric and/or a server metric for each of a plurality of servers.

Any to all of the dimensions employed by the load balancing logic can comprise an associated cap value or threshold value. Where a metric of a dimension exceeds the cap value, the one or more resources of the dimension may be considered over utilized by the load balancing logic. An example of a cap value is a server cap value, which corresponds to a threshold value for a server metric, a process metric, or other server related metric. Furthermore, any to all of the dimensions employed by the load balancing logic can comprise an associated improvement threshold. The improvement threshold can be compared to an amount of improvement to a modeled state of the scalable storage that would be caused by at least one load balancing operation, as quantified by an evaluation score. If the amount of improvement does not exceed the improvement threshold, the at least one load balancing operation may not be selected for execution on the scalable storage.

Any to all of the dimensions employed by the load balancing logic can also comprise an associated ranking or weight value with respect to other dimensions that may be employed by the load balancing logic.

Having described some exemplary constituents of a dimension. An exemplary CPU dimension is described. A CPU dimension can be defined by any or all of partition metrics that quantify CPU utilization of a single partition, process metrics that quantify cumulative CPU utilization for all partitions assigned to a server, and server metrics that quantify total CPU utilization on a server. The CPU dimension may further comprise a server cap, for example of 90% of CPU utilization, a weight value of, for example, 1, and an improvement threshold of, for example, 10%.

An exemplary partition count dimension can be defined by any or all of partition metrics that quantify partition utilization of a single partition (which can typically be set to 1), and process or server metrics that quantify partition utilization for all partitions assigned to a server (i.e. the number of partitions assigned to the server). The partition count dimension may further comprise a server cap, for example of 50 partitions, a weight value of, for example, 2, and an improvement threshold of, for example, 1 partition.

Generally, a CPU dimension has a higher weight value or ranking than other dimensions, such as a partition count dimension. However, it is noted that any of the various constituents of the dimensions may be reconfigured and/or redefined while still being compatible with the load balancing logic. For example, the weight value or ranking may be dynamically configurable.

Also, in various implementations, at least some of the metrics of dimensions that are employed by the load balancing logic can be normalized, such that different metrics of different dimensions can be easily compared. In other words, the metrics between different dimensions may be compared utilizing a notionally common scale. As one example, a metric may be normalized as a percentage of a defined capacity for that metric. The capacity for that metric can be the aforementioned cap value or threshold value, as one example. If a metric, such as a partition metric, corresponds to 10% CPU utilization, it may be normalized to 0.1 based on a capacity of 100% CPU utilization. By similarly scaling metrics of different dimensions as percentages of metric capacity, those metrics may easily be compared. In this example, the scaled metrics can have values ranging from 0 to 1.

Dimension Optimization based on Cap Value

In some implementations, an optimization module, which may be employed in framework 300 (e.g. as optimization module 320*b*), has an optimization goal to ensure that one or more metrics of one or more dimensions of the scalable storage are not exceeding a corresponding cap value. An optimization routine of the optimization module can utilize any of the various optimization functions described herein.

In some implementations, a trigger condition is determined as being met based on comparing one or more of the metrics of the dimensions to a threshold value, such as a corresponding cap value for the one or more metrics (e.g. a server cap for a server metric). If, for example, any metric (e.g. any server metric) exceeds a particular percentage (e.g. 50%) of the corresponding cap value, the threshold condition may be determined as met. In some implementations, if none of the server metrics of the servers exceed the corresponding cap value for any dimension the threshold condition may not be determined as met, but if any of the server metrics exceed the corresponding cap value for any dimension, the threshold condition may be determined as met.

An evaluation score for an optimization module that utilizes one or more dimensions can be based on one or more of at least one of a metric of a dimension (x), the corresponding cap value (T), the ranking or weight value of the dimension (w), and a value that indicates by how much the metric of the dimension is exceeding the corresponding cap value. As a specific example, an evaluation formula for a given server can comprise $S=\Sigma_i p_i^* w_i$, where $$p(x) = \begin{cases} 0, & \text{when } x < T \\ e^{ax} - e^{aT}, & \text{when } x \geq T \end{cases},$$

where each dimension i has a server metric x. Constant a controls the slope of the evaluation formula (the scaling factor on the X-axis). Values for constant a range from approximately 2 to approximately 10, as examples.

This exemplary evaluation formula has exponential growth with respect to the server metric. It will therefore be appreciated that in some implementations, the evaluation score increases exponentially with one or more metrics in the evaluation formula.

The exemplary evaluation formula can be for a given server, however, multiple servers can be considered in the evaluation score by utilizing the exemplary evaluation formula for each of the multiple servers and adding the results. Thus, the evaluation score may correspond to one server, multiple servers, or all servers of the scalable storage, as desired.

A propose candidates function for an optimization module that utilizes one or more dimensions can comprise selecting a plurality of candidate operations based on one or more metrics of one or more dimensions. In some implementations, the plurality of candidate operations is selected based on the server metric of the server to which the plurality of candidate operations are assigned.

In some implementations, selecting the plurality of candidate operations comprises identifying one or more servers that have a server metric of a dimension, or a particular dimension that exceeds a threshold value, such as the server cap.

At least some of the partitions assigned to those servers can be added to a candidate partition set. However, one or more partitions may be excluded from the candidate partition set based on traffic associated with the one or more partitions, for example, high traffic partitions may be excluded.

Furthermore, the one or more servers can be identified based on server load, such that the plurality of candidate operations is selected based on server load of the one or more servers. For example, the propose candidates function can sort each server of the scalable storage from busiest to idlest as quantified by a load metric, such as a server load metric. One or more of the busiest of those servers may be selected as the one or more servers from which the partitions may be selected for the candidate partition set.

The server load metric can be based on at least one of any of server metrics (d) of one or more dimensions (i), and rankings or weight values (w) for the one or more dimensions. In one implementation, a server load metric comprises Load=$\Sigma_i d_i * w_i$.

The propose candidates function can determine a dimension of the one or more servers that has the single highest server metric. Furthermore, the propose candidates function may sort the servers of the scalable storage from highest to lowest server metric of the dimension. A candidate target server set may be selected as a number of those servers that have the lowest server metric of the dimension. Thus, servers can be added to the candidate target server set based on a server metric of a dimension, for example, based on having a low server metric.

The plurality of candidate operations that are selected by the propose candidates function may then, for example, be ones that would reduce the server metric of a dimension that has exceeded a server cap for one or more servers. For example, movement load balancing operations of the plurality of candidate operations can comprise the Cartesian product of the candidate partitions set and the candidate target server set. Thus, a load balancing operation could comprise a given partition from the candidate partitions set being moved to a given server of the candidate target server set, for each combination of partition and server in the sets.

Thus, the optimization routine of the optimization module can utilize the plurality of candidate operations from the propose candidates function to select at least one operation for execution on the scalable storage. The plurality of candidate operations can be filtered by the optimization routine utilizing any of the various optimization functions, such as a keep favorable function and keep least unfavorable functions.

Dimension Spread Optimization

In some implementations, an optimization module, which may be employed in framework 300 (e.g. optimization module 320*b*), has an optimization goal to spread metrics of dimensions, of a plurality of dimensions, amongst the servers of the scalable storage. This optimization goal may be desirable for various reasons, such as to reduce the risk of the servers of the scalable storage becoming overloaded. An optimization routine of an optimization module implementing a dimensional spread optimization can utilize any of the various optimization functions described herein.

With such an optimization goal in mind, a trigger condition of a triggered optimization module may be determined as met where one or more metrics of one or more dimensions of the scalable have an imbalance with respect to servers of the scalable storage. Therefore, the optimization routine for at least one of the plurality of optimization modules of framework 300 may be performed in response to one or more metrics of one or more dimensions of the scalable having an imbalance with respect to servers of the scalable storage.

Whether or not or more metrics have the imbalance may be quantified by a trigger formula and a trigger score. In some implementations, the trigger condition is determined as being met where at least one of the one or more metrics has the imbalance.

In some implementations, the trigger condition is determined as being met based on comparing one or more of the metrics of the dimensions to a threshold value, such as a corresponding cap value for the one or more metrics (e.g. a server cap for a server metric). In addition or instead, the trigger condition can be determined as being met utilizing a trigger formula based on at least one of any of server load (L), one or more busiest servers (i), and one or more idlest servers (j). An exemplary trigger formula comprises S=$\overline{L}_i$/$\overline{L}_{j*}$=, which is a ratio between the average server load of one or more busiest servers and the average server load of one or more idlest servers. The server load can comprise the server load metric described above. The trigger condition can then be determined as being met based on trigger score S exceeding a threshold value. For example, if the trigger score is less than 1.5, the trigger condition may still be met.

The trigger condition may also be based on a quota that sets a global rate of load balancing operations being executed on the scalable storage. The quota be implemented similar to what has been described above with respect to various exemplary factors of a trigger condition.

Thus, the trigger formula can allow for a trigger score of the trigger condition to be compared to a threshold value. Thus, determining that the one or more metrics of one or more dimensions of the scalable have an imbalance with respect to servers of the scalable storage can comprise comparing a trigger score calculated from the modeled state of the scalable storage to a threshold value. The trigger condition may be determined as met based on the trigger score exceeding the threshold value.

An evaluation score for an optimization module implementing a dimension spread optimization can quantify the balance of one or more metrics of one or more dimensions of the scalable with respect to servers of the scalable storage. It may be desirable for an evaluation formula that generates an evaluation score to be different than a trigger function that generates a trigger score. One reason it may be desirable to utilize an evaluation formula that is different than a trigger formula is where the trigger formula cannot be effectively utilized to characterize improvement made by at least one load balancing operation. For example, some load balancing operations that improve dimension spread may not change the trigger formula. It may be desirable to utilize a variance formula or a standard deviation formula for the evaluation formula.

In some implementations, the evaluation score is based on at least one of one or more dimensions (i), one or more partition servers (j), one or more metrics (d), and/or one or more ranking or weight values (w). As a specific example, the evaluation formula can comprise $S_i=\Sigma_j(d_{ij}-\overline{d}_i)^2$, where $\overline{d}_i$ is the average of $d_{ij}$ over j. Thus, the evaluation score of the triggered optimization module can be calculated from a variance formula based on server metrics of the servers.

The exemplary evaluation formula can be for a given dimension, however, multiple dimensions can be considered in the evaluation score by utilizing the exemplary evaluation formula for each of the multiple dimensions and adding the results. Thus, the evaluation score may correspond to one dimension, multiple dimension, or all dimensions of the scalable storage, as desired. As an example, the evaluation formula can correspond to $S=\Sigma_i w_i S_i$, where S is the evaluation score.

A propose candidates function can comprise selecting a plurality of candidate operations based on server load of one or more servers. For example, the propose candidates function can sort each server of the scalable storage from busiest to idlest as quantified by a load metric, such as the server load metric. One or more of the busiest of those servers may be selected as the one or more servers.

At least some of the partitions assigned to those servers can be added to a candidate partition set. However, one or more partitions may be excluded from the candidate partition set based on traffic associated with the one or more partitions, for example, high traffic partitions may be excluded.

Furthermore, a candidate target server set may be selected as a number of servers that have the lowest server load. The plurality of candidate operations that are selected by the propose candidates function may then, be determined from the propose candidate set and the propose target server set. For example, movement load balancing operations of the plurality of candidate operations can comprise the Cartesian product of the candidate partitions set and the candidate target server set. Thus, a load balancing operation could comprise a given partition from the candidate partitions set being moved to a given server of the candidate target server set, for each combination of partition and server in the sets.

Thus, the optimization routine of the optimization module can utilize the plurality of candidate operations from the propose candidates function to select at least one operation for execution on the scalable storage. The plurality of candidate operations can be filtered by the optimization routine utilizing any of the various optimization functions, such as a keep favorable function and keep least unfavorable functions.

Account Spread Optimization

The load balancing logic implemented in framework 300 can have an optimization goal to spread partitions from an account, of a plurality of accounts, hosted by the scalable storage, amongst the servers of the scalable storage. For example, it may be desirable to spread the partitions to as many servers as possible. This may be desirable for various reasons, such as to reduce the chance that a limited number of servers being compromised heavily impacts the partitions of the account. An optimization routine of an optimization module implementing account spread optimization can utilize any of the various optimization functions described herein.

With such an optimization goal in mind, a trigger condition of a triggered optimization module may be determined as met where partitions of an account hosted by the scalable storage have an imbalance in assignments with respect to servers of the scalable storage. Therefore, the optimization routine for at least one of the plurality of optimization modules of framework 300 may be performed in response to a plurality of partitions of an account of a plurality of accounts hosted by the scalable storage having an imbalance in assignments with respect to one or more of the servers.

Whether or not a particular account or multiple accounts of the plurality of accounts have the imbalance may be quantified by a trigger formula and a trigger score. In some implementations, the trigger condition is determined as being met where at least one of the plurality of accounts has the imbalance.

In some implementations, the trigger condition is based on at least one of the total number of partitions associated with an account ($C_{total}$), the total number of servers available to the partitions associated with the account in the scalable storage ($N_{total}$), the number of the servers that contain at least one of the partitions associated with account ($N_{assigned}$), and the maximum number of servers to which the partitions of the account could potentially be spread ($\min(C_{total}, N_{total})$). The trigger condition can also be based on at least one of the maximum number of the partitions that can be assigned to a given server ($C_1$), and the ideal maximum number of the partitions that could be assigned to the same server, were the partitions of the account perfectly spread ($C_2$). For example, $C_2$ may be equal to $C_{total}/N_{total}$.

As a specific example, the trigger condition can comprise a trigger formula $S=(N_{max}-N_{assigned})/N_{max}+(C_1-C_2)/C_{total}$, where S is a trigger score of the trigger function. $(N_{max}-N_{assigned})/N_{max}$ quantifies the account spread in terms of the servers currently hosting the partitions of the account. The higher the value, the worse the account spread. $(C_1-C_2)/C_{total}$ quantifies the account spread in terms of the maximum potential risk of losing availability of partitions if one of the servers becomes compromised. The higher the value, the higher the maximum potential risk.

Therefore, suppose an account has 3 partitions ($C_{total}$), and they are all assigned to one server of 100 total partition servers ($N_{total}$) in the scalable storage. $N_{assigned}=1$, since all 3 partitions are assigned to 1 server. $N_{max}=\min(100, 3)=3$, which indicates that the partitions could potentially be hosted by 3 servers. $C_1=3$, since the maximum number of partitions in one server is 3 in this example. $C_2=(3/100)$ rounded to 1, since an ideal account spread would have the 3 partitions spread to 3 servers, with 1 partition per server. A resultant trigger score S, in this example, would be $(3-1)/3+(3-1)/3$=approximately 1.3333.

Advantageously, the trigger formula allows for the trigger score to be easily and effectively compared to a threshold value. Thus, determining that the partitions of the account hosted by the scalable storage have an imbalance can comprise comparing a trigger score calculated from the modeled state of the scalable storage to a threshold value. The trigger condition may be determined as met based on the trigger score exceeding the threshold value. For example, utilizing the exemplary trigger formula above, the trigger condition may be determined as met based on the trigger score exceeding 1, in the positive direction. It will be appreciated that the threshold value can optionally be configured and tuned over time.

An evaluation score for an optimization module implementing an account spread optimization can quantify an imbalance in a plurality of partitions of an account of a plurality of accounts hosted by the scalable storage. It may be desirable for an evaluation formula that generates an evaluation score to be different than a trigger function that generates the trigger score. One reason it may be desirable to utilize an evaluation formula that is different than a trigger formula is where the trigger formula does not effectively track improvement made by at least one load balancing operation. For example, some load balancing operations that improve account spread may not change the results of the trigger formula described above. It may be desirable to utilize a variance formula or a standard deviation formula for the evaluation formula.

In some implementations, the evaluation score is based on at least one of the number of partitions of an account on a given server (d), and the average number of partitions of the account for any given server ($\bar{d}$). As a specific example, the evaluation formula can comprise $S=\Sigma_i(d_i-\bar{d})^2$, where S is the evaluation score and is evaluated for each server i of the account. Thus, the evaluation score of the triggered optimization module can be calculated from a variance formula based on amounts of the assignments of the partitions belonging to the servers.

A propose candidates function that can be utilized by an optimization module implementing an account spread optimization can comprise identifying one or more accounts of the plurality of accounts that have a trigger score, an evaluation score, or other score that is indicative of account spread, that exceeds a threshold value (i.e. accounts that are imbalanced). The trigger score and trigger formula may be considered respectively for one or more accounts of the plurality of accounts. Utilizing the exemplary trigger score and trigger formula described above, the threshold value may be 1 for each account being considered. The threshold value and the trigger formula are configured such that an account having 2 partitions, all on the same server (with at least one other server available for a partition), will be considered imbalanced (i.e. the threshold value will be exceed in this case). However, in the same example, if each partition is on a separate server the account will not be considered imbalanced (i.e. the threshold value will be not be exceed in this case).

In some implementations, the propose candidates function proposes the plurality of candidate operations for a single account at a time. For example the optimization routine of the optimization module may be performed for a single account, with the evaluation score being considered with respect to that account. It is noted that in various implementations, the optimization routine of the optimization routine may be performed for multiple accounts, with the evaluation score being considered with respect to those accounts. Thus, a propose candidates function may propose the plurality of candidate operations for any number of the plurality of accounts.

The optimization routine may be repeated for the same account(s) or a different account(s) based on the trigger condition of the optimization module still being met in an updated modeled state. In some implementations, the account(s) being considered in a given optimization routine is selected in a round robin fashion from the plurality of accounts.

In some implementations, the load balancing operations are selected by the propose candidates function based on traffic associated with the partitions. For example, load balancing operations that are associated with one or more of the partitions that are experiencing high traffic may not be included in a plurality of candidate operations, which are provided by the propose candidates functions. In some implementations, the propose candidates function only considers load balancing operations that are associated with one or more of the partitions that have traffic that does not exceed a threshold value. Thus, at least one of load balancing operations may be excluded from the plurality of candidate operations based on one or more associated partitions having high traffic.

The propose candidates function can select the plurality of candidate operations based on amounts of partitions of an account(s) that are assigned to the servers. For example, the propose candidates function can identify and consider the amount of the partitions assigned to any to all servers of the scalable storage. In some implementations, the propose candidates function determines which of the servers host the highest amount of the partitions of the account(s). The partitions assigned to those servers can be added to a candidate partition set. Thus, the propose candidates function can comprise selecting a plurality of candidate operations based on an amount of assignments of partitions belonging to ones of the servers as compared to others of the servers, for example based on a high amount of the partitions being assigned to a server. Ones or more partitions may be excluded from the candidate partition set based on traffic associated with the one or more partitions, for example, high traffic partitions may be excluded.

In some implementations, the propose candidates function determines which of the servers host the lowest amount of the partitions of the account(s). Those servers can be added to a candidate target server set. Thus, servers can be added to the candidate target server set based on the amounts of the partitions that are assigned to the servers.

The propose candidates function can select the plurality of candidate operations based on server load of the servers of the scalable storage. For example, the propose candidates function can sort each server of the scalable storage from busiest to idlest as quantified by a load metric, such as the server load metric described above. The candidate target server set may be limited to a number of those servers that have the lowest server load. Thus, servers can be added to the candidate target server set based on server load, for example, based on having low server load.

The plurality of candidate operations that are selected by the propose candidates function may then, for example, be ones that would increase the spread of any of the partitions in the candidate partitions set, where any of the servers in the candidate target server set would receive a new partition of the account(s). For example, movement load balancing operations of the plurality of candidate operations can comprise the Cartesian product of the candidate partitions set and the candidate target server set. Thus, a load balancing operation could comprise a given partition from the candidate partitions set being moved to a given server of the candidate target server set, for each combination of partition and server in the sets.

Thus, the optimization routine of the optimization module can utilize the plurality of candidate operations from the propose candidates function to select at least one operation for execution on the scalable storage. The plurality of candidate operations can be filtered by the optimization routine utilizing any of the various optimization functions, such as a keep favorable function and keep least unfavorable functions. However, if utilized, the keep favorable function may not filter out any of the plurality of candidate operations due to them all being favorable to the optimization module in light of the means for selecting the plurality of candidate operations in the propose candidates function.

Additional Optimization Module Based Examples

In one aspect, a computer-implemented method for load balancing a scalable storage is provided. The method comprising: determining that a trigger condition of a triggered optimization module of a plurality of optimization modules is met; optimizing the scalable storage based on an optimization routine, the optimization routine comprising: providing a plurality of candidate operations, wherein the plurality of candidate operations are potential load balancing operations associated with partitions assigned to servers of the scalable storage; for a selected optimization module of the plurality of optimization modules that has a higher priority than the triggered optimization module, removing a candidate operation from the plurality of candidate operations that would diminish a modeled state of the scalable storage as quantified by an evaluation score of the selected optimization module; and determining at least one operation of the plurality of candidate operations that would improve the modeled state of the scalable storage as quantified by an evaluation score of the triggered optimization module; and updating the modeled state of the scalable storage to model executing the at least one operation on the scalable storage; executing the at least one operation on the scalable storage.

In another aspect, one or more computer-storage media storing computer-useable instructions that, when executed by a computing device, perform a method for load balancing a scalable storage is provided. The method comprising: for each triggered optimization module, of a plurality of optimization modules, optimizing the scalable storage based on an optimization routine, the optimization routine comprising: providing a plurality of candidate operations, wherein the plurality of candidate operations are potential load balancing operations associated with partitions assigned to servers of the scalable storage; for a selected optimization module of the plurality of optimization modules that has a higher priority than the triggered optimization module, removing a candidate operation from the plurality of candidate operations that would diminish a modeled state of the scalable storage as quantified by an evaluation score of the selected optimization module; determining at least one operation of the plurality of candidate operations that would improve the modeled state of the scalable storage as quantified by an evaluation score of the triggered optimization module; adding the at least one operation to a set of proposed operations; and updating the modeled state of the scalable storage to model executing the at least one operation on the scalable storage; executing the set of proposed operations on the scalable storage.

Figure 6:
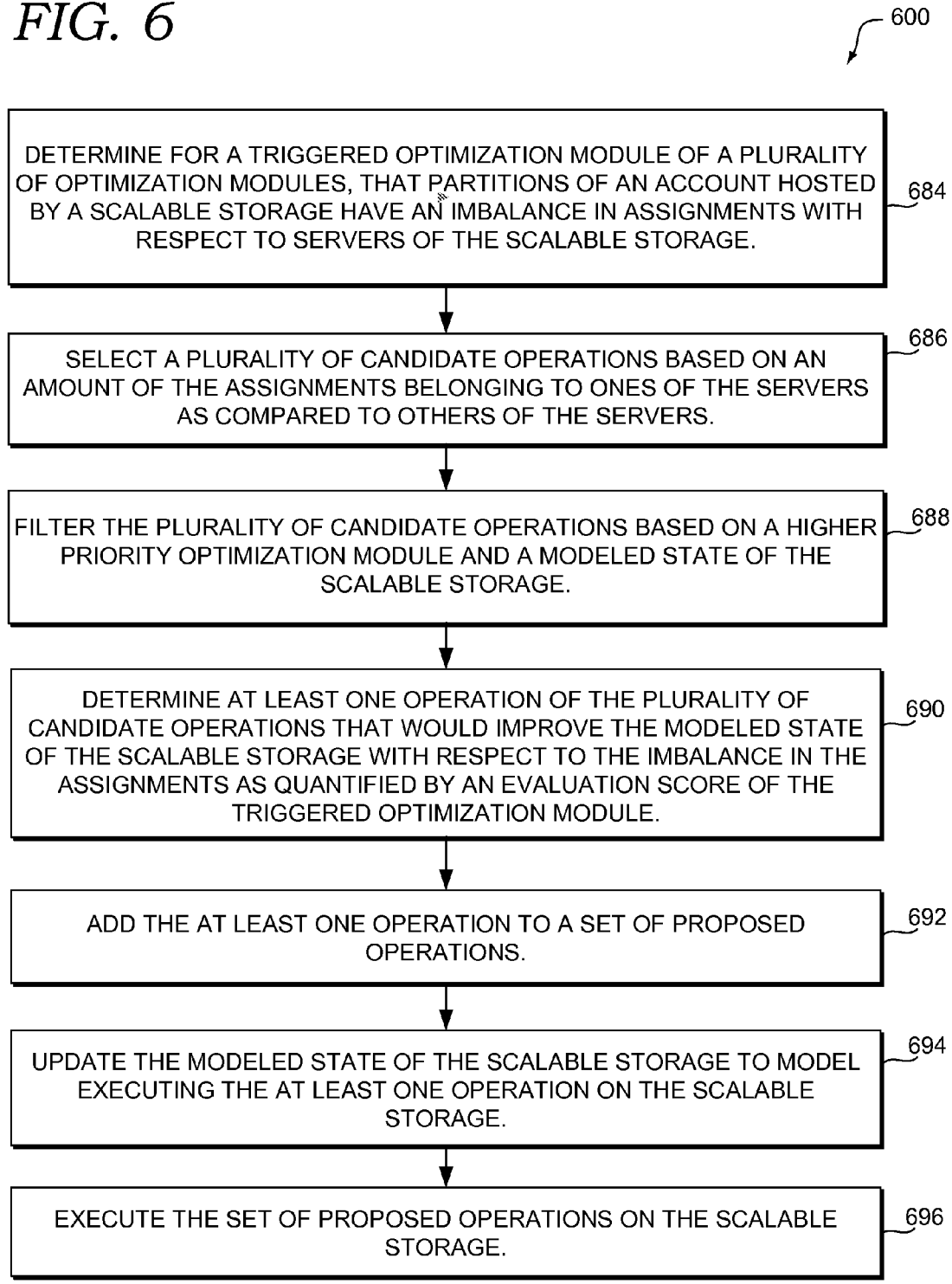
FIG. 6 depicts a flow diagram of an exemplary method for load balancing a scalable storage in accordance with implementations of the present disclosure.

Referring to FIG. 6, FIG. 6 depicts a flow diagram of an exemplary method for load balancing a scalable storage in accordance with implementations of the present disclosure. In particular, FIG. 6 depicts a flow diagram of method 600, in accordance with implementations of the present disclosure. In one aspect, a computer-implemented method for load balancing a scalable storage is provided (e.g. method 600 in FIG. 6). The method comprising: determining, for a triggered optimization module of a plurality of optimization modules, that partitions of an account hosted by the scalable storage have an imbalance in assignments with respect to servers of the scalable storage, and in response to the determining (e.g. 684 in FIG. 6), performing a selection comprising: selecting a plurality of candidate operations based on an amount of the assignments belonging to ones of the servers as compared to others of the servers, wherein the plurality of candidate operations are potential load balancing operations associated with the partitions assigned to the servers of the scalable storage (e.g. 686 in FIG. 6); for a selected optimization module of the plurality of optimization modules that has a higher priority than the triggered optimization module, removing a candidate operation from the plurality of candidate operations that would diminish a modeled state of the scalable storage as quantified by an evaluation score of the selected optimization module (e.g. 688 in FIG. 6); and determining at least one operation of the plurality of candidate operations that would improve the modeled state of the scalable storage with respect to the imbalance in the assignments as quantified by an evaluation score of the triggered optimization module (e.g. 690 in FIG. 6); adding the at least one operation to a set of proposed operations (e.g. 692 in FIG. 6); updating the modeled state of the scalable storage to model executing the at least one operation on the scalable storage (e.g. 694 in FIG. 6); executing the set of proposed operations on the scalable storage (e.g. 696 in FIG. 6).

Heuristic Load Balancing of Dimensions

Exemplary approaches have been described above, which can be employed to load balance scalable storage utilizing one or more dimensions. For example, one or more optimization modules can be employed to implement dimensional load balancing. Other approaches to load balancing are described below and may generally be referred to as heuristic based approaches for convenience only and should not limit the features of various approaches described herein, including optimization module based approaches described above. Moreover, concepts described with respect to any of the various exemplary approaches herein should not be considered exclusive to a particular approach. For example, the dimensions described above can be implemented in the heuristic based approaches.

In some implementations, a heuristic based approach comprises generating a plurality of assignment plans for partitions to servers, where each assignment plan can be generated utilizing a different assignment heuristic. The assignment plans can be analyzed and/or compared to each other and/or assignment criteria, and in response one of the assignment plans can be selected for execution on the scalable storage. Utilizing assignment heuristics can provide for a highly optimal assignment plan for execution on the scalable storage without consuming significant resources.

Figure 7:
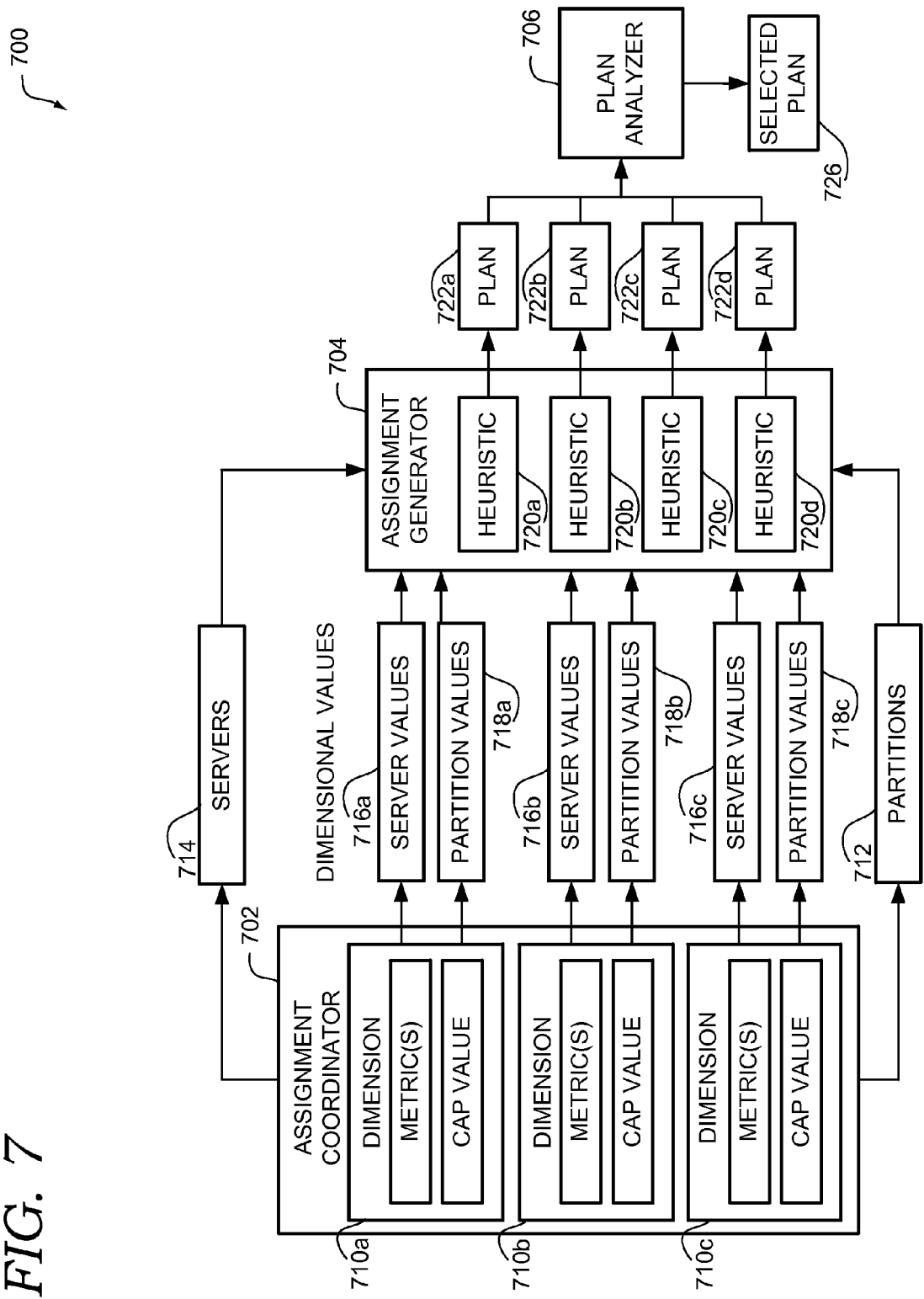
FIG. 7 depicts an exemplary load balancing system in which implementations of the present disclosure may be employed.

Referring to FIG. 7, FIG. 7 depicts an exemplary load balancing system in which implementations of the present disclosure may be employed. In particular, FIG. 7 depicts load balancing system 700 in which implementations of the present disclosure may be employed. Although the various constituents of FIG. 7 are shown with lines for the sake of clarity, in reality, delineating various constituents is not so clear, and metaphorically, the lines may more accurately be grey or fuzzy. Furthermore, the depiction of some of those constituents being within others is only intended to show an association between those constituents. It is also noted that arrows in FIG. 7 are not intended to limit the present disclosure to specific timing or ordering, including whether information or processes are accounted for serially or in parallel.

Load balancing system 700 comprises assignment coordinator 702, assignment generator 704, and plan analyzer 706. Assignment coordinator 702 can be configured to manage the generation of assignment plans for partitions to servers. In this respect, assignment coordinator 702 can be configured to collect and provide one or more partitions 712 to assignment generator 704 for assignment and one or more servers 714 (e.g. servers 204, 206, 208, and 210 in FIG. 2) of scalable storage (e.g. scalable storage 200 in FIG. 2) to assignment generator 704 that may receive those assignments. Assignment coordinator 702 can also be configured to determine which partitions of the scalable storage are included in partitions 712.

Partitions 712 can comprise partitions of the scalable storage that are presently assigned to servers of the scalable storage. For example, the partitions can be selected for offload from their corresponding servers. At least some of the partitions can be from at least one server of the scalable storage that has a dimensional value (e.g. server value) of at least one of the dimensions that is exceeding a cap value.

Partitions 712 can instead or additionally comprise partitions that are unassigned to servers of the scalable storage. Partitions 712 may be assigned to or were previously assigned to one or more servers of the scalable storage that have failed, been shut down, or are otherwise unavailable to host any of partitions 712.

Assignment coordinator 702 can be configured to provide one or more servers 714 to which partitions 712 may be assigned. Servers 714 may comprise all servers of the scalable storage or a subset therefrom. Furthermore servers 714 may comprise all servers having available capacity in any dimension or dimensions or a given dimension or dimensions, or a subset therefrom.

Assignment coordinator 702 can also be configured to provide dimensional values to assignment generator 704. Dimensional values are derived from metrics of dimensions, such as dimensions 710*a*, 710*b*, and 710*c*, shown in FIG. 7. Exemplary dimensions have been described above. Each dimension shown comprises one or more metrics that quantify one or more resources of the dimension.

The dimensional values can comprise partition values of the dimensions and/or server values of the dimensions. A partition value can correspond to a metric of a dimension with respect to one or more partitions (e.g. a single partition). For example, a partition value can be derived from a partition metric of a dimension. A server value can correspond to a metric of a dimension with respect to one or more servers (e.g. a single server). For example, a server value can be derived from a server metric or a process metric of a dimension.

A server value may also be derived from partition values and/or partition metrics. For example, a server value of a server for a dimension can be derived from the partition values of the dimension, where the partition values correspond to the partitions that are assigned to the server. As a more particular example, a server value of a server can be substantially equal to, greater than or equal to, or otherwise based on a sum of partition values for all partitions that are assigned to the server. Furthermore, each of the partition values may correspond to one of the partitions that are assigned to the server. Therefore, a server having four partitions assigned thereto may have a server value corresponding to a sum of four partition values, each partition value corresponding to one of the partitions. The server value may also include additional overhead that may not be accounted for in a partition value.

As shown, in FIG. 7, assignment coordinator 702 is providing dimensional values to assignment generator 704 that comprise server values 716a, 716b, and 716c and partition values 718a, 718b, and 718c. Server values 716a and partition values 718a are derived from one or more metrics of dimension 710a. Server values 716b and partition values 718b are derived from one or more metrics of dimension 710b. Furthermore, server values 716c and partition values 718c are derived from one or more metrics of dimension 710c. Although referred to in plural, in some implementations only one server value and one partition value may be provided by assignment coordinator 702 for any given dimension. Furthermore, a partition value and/or a server value may not necessarily be provided by assignment coordinator 702 for every dimension.

Server values 716a can each correspond to a different server or servers. Also, server values 716a can each be derived from the same metric or metrics of dimension 710a, such as the same server metric. Similarly, server values 716b can each correspond to a different server or servers. Also, server values 716b can each be derived from the same metric or metrics of dimension 710b, such as the same server metric. Server values 716c can each correspond to a different server or servers. Also, server values 716c can each be derived from the same metric or metrics of dimension 710c, such as the same server metric. By being based on a common metric or metrics within a dimension, server values for different servers can easily be compared to one another within a given dimension.

A given server or servers can have a corresponding server value from each of the dimensions. For example, one of server values 716a, one of server values 716b, and one of server values 716c can each correspond to the same server or servers. However, in some implementations, each of the server or servers may only have a corresponding server value for a subset of the total dimensions (e.g. server values for dimensions 710a and 710b, but no server value for dimension 710c). In these cases, the missing server value may be assigned a default value (e.g. 0), or may indicate that the corresponding server or servers is unavailable for being utilized on a dimension corresponding to the missing server value, as some examples.

Furthermore, partition values 718a can each correspond to a different partition or partitions. Also, partition values 718a can each be derived from the same metric or metrics of dimension 710a, such as the same partition metric. Similarly, partition values 718b can each correspond to a different partition or partitions. Also, partition values 718b can each be derived from the same metric or metrics of dimension 710b, such as the same partition metric. Partition values 718c can each correspond to a different partition or partitions. Also, partition values 718c can each be derived from the same metric or metrics of dimension 710c, such as the same partition metric. By being based on a common metric or metrics within a dimension, partition values of for different partitions can easily be compared to one another within a given dimension.

A given partition or partitions can have a corresponding partition value from each of the dimensions. For example, one of partition values 718a, one of partition values 718b, and one of partition values 718c can correspond to the same partition or partitions. However, each partition or partitions may not necessarily have a corresponding partition value for every dimension.

By way of example, in the present implementation, each of server values 716a can correspond to one of servers 714, each of server values 716b can correspond to one of servers 714, and each of server values 716c can correspond to one of servers 714. Similarly, each of partition values 718a can correspond to one of partitions 712, each of partition values 718b can correspond to one of partitions 712, and each of partition values 718c can correspond to one of partitions 712.

The dimensional values may be represented in vectors of dimensional values. For example, a particular partition or partitions can have its corresponding partition values from each of the dimensions represented in a partition vector of those partition values. Similarly, a particular server or servers can have its corresponding server values from each of the dimensions represented in a single server vector of those server values. Server vectors and/or partition vectors may share the same ordering with respect to the dimensions for convenience. For example, in each of the dimensional vectors, the first dimensional value may correspond to dimension 710a, the second dimensional value to dimension 710b, the third dimensional value to 710c, and so on.

Assignment generator 704 can be configured to receive partitions 712 for the assignment to the servers of the scalable storage. Receiving partitions 712 can comprise receiving any of partition values 718a, 718b, 718c, and/or other partition values that correspond to partitions 712. For example, a partition vector can optionally be received for each of partitions 712. The partition values are not necessarily received contemporaneously with each other or a corresponding partition.

Assignment generator 704 can also be configured to receive servers 714 for which to assign partitions 712. Receiving servers 714 can comprise receiving any of server values 716a, 716b, 716c, and/or other partition values that correspond to servers 714. For example, a server vector can optionally be received for each of servers 714. The server values are not necessarily received contemporaneously with each other or a corresponding server.

Assignment generator 704 can also be configured to generate assignment plans 722a, 722b, 722c, and 722d for the assignment of partitions 712 to the servers. In various implementations, an assignment plan describes which partition or partitions of partitions 712 are to be assigned to which server of the scalable storage. In some implementations, partitions 712 can be split, merged, or otherwise modified prior to or as part of an assignment plan.

Assignment plans 722a, 722b, 722c, and 722d and/or other assignment plans can be determined by different assignment heuristics. For example, assignment plan 722a is determined by assignment heuristic 720a, assignment plan 722b is determined by assignment heuristic 720b, assignment plan 722c is determined by assignment heuristic 720c, and assignment plan 722d is determined by assignment heuristic 720d.

Optimally assigning partitions to servers can be an NP hard problem, which is can be computationally expensive as well as time consuming Consumed resources may be highly valuable in scalable storage, where a large number of partitions and servers may be employed. The assignment heuristics can each comprise a different heuristic for assigning the partitions to the servers, which is not guaranteed to result in an optimal assignment plan, but can be have low computational and time requirements. Any number assignment heuristics and assignment plans can be implemented. As a specific example, some implementations employ thirty-six assignment heuristics and corresponding assignment plans.

The assignment heuristics can be implemented in many different manners and can account for many different factors. Generally, assignment heuristics may be distinguishable from one another by having different outcome determinative properties with respect to generating an assignment plans. In other words, different assignment heuristics may be capable of producing different assignment plans, and optionally may do so based on the same inputs (e.g. partitions 712 and/or servers 714). In this respect, each assignment heuristic may correspond to a different assignment strategy for partitions 712.

Utilizing any to all of the assignment heuristics, assignment generator 704 may determine an assignment of a partition to a server based on the server having available capacity to host the partition with respect to one to all of the dimensions. Additionally, or instead, assignment generator 704 may determine an assignment of a partition to a server based on the server having the lowest or a threshold amount of utilization with respect to one to all of the dimensions.

In some implementations, capacity of a server for a given dimension can be determined by a cap value or threshold value, such as has been described above. Available capacity can then correspond to a difference between the cap value (e.g. server cap) and utilization with respect to the given dimension. Utilization with respect to the given dimension may correspond to a server value (e.g. a sum of partition values that correspond to the server).

As indicated previously, the dimensional values may be normalized to a notionally common scale. For example, the partition values can be normalized to a notionally common scale and the server values can be normalized to a notionally common scale. Doing so can allow for dimensional values from different dimensions to easily be compared, for example, in determining assignments for partitions and/or evaluating assignment plans.

In one respect, utilizing any to all of the assignment heuristics, assignment generator 704 may determine assignment plans 722a, 722b, 722c, and 722d and/or other assignment plans, at least in part, by bin packing any of partition values 718a, 718b, and 718c of the dimensions into server bins of servers 714. In addition to or instead of bin packing, other assignment strategies can be employed.

In bin packing, any given server bin can have a size or volume that corresponds to capacity (e.g. a cap value) and an occupied volume that corresponds to present utilization (e.g. a server value or a sum of partition values of the server). The bin packing can be multi-dimensional, for example, where partition vectors are employed, the bin packing may comprise vector bin packing of the partition values that correspond to different dimensions into server bins that correspond to the different dimensions.

Different assignment heuristics may employ different fit strategies for the bin packing of the partitions. Some of those fit strategies may allow for any of the servers to exceed capacity with respect to a dimension, which may be a limited number of times, by a limited amount, and/or for designated dimensions. In some implementations, a first strategy may be employed and if all of partitions 712 are not assigned in an assignment plan using the first fit strategy, a second fit strategy may be employed that adds the additional assignments to the assignment plan. For example, the first fit strategy may attempt to maintain server bins below capacity and the second fit strategy may disregard capacity or increase cap values. Exemplary fit strategies comprise first fit, best fit, worst fit, next fit, or any combination or variation thereof.

Assignment heuristics may be distinguished by how they determine whether or not at least one partition being analyzed will be assigned to a server being analyzed. Also, assignment heuristics may additionally or instead be distinguished by the order in which the partitions and/or servers are selected for the analysis.

In some implementations, generating at least one of the assignment plans includes iteratively searching for at least one candidate server for the assignment of at least one given partition to the at least one candidate server using a search order. At least one candidate server may be selected in an iteration of the searching for the at least one candidate server. Furthermore, the at least one candidate server can be added to the given assignment plan for the assignment of the partitions to the servers.

The search order can be determined by an assignment heuristic. In some aspects, the search order can be made different by utilizing different search algorithms and/or different search methodologies for different searches. For example, one assignment heuristic could correspond to a binary search methodology and another could correspond to a linear search methodology. The search methodology may be employed in bin packing or in other assignment strategies. Where each of the search methodologies operates on a list, such as a list of dimensional vectors or values, each may receive the same list, but search that list in a different search order.

Also in some implementations, the search order can be different by virtue of utilizing the same search algorithm and/or search methodology, but providing the search algorithm(s) with sorted lists having different orderings. For example, the same binary search algorithm may produce different outputs depending on the order of a sorted list that is input into the algorithm.

Any of the search orders can be of at least one of the partitions (e.g. 712) being assigned and the servers (e.g. 714) for assignment of the partitions. For example, a search order may correspond to the order by which at least one partition is selected to be assigned to a server. A search order may also correspond to the order by which the servers are searched through for assignment to the selected at least one partition.

In some implementations, the search orders of at least one of the partitions being assigned and the servers to which the partitions are assigned are determined by ordering those partitions or servers based on corresponding dimensional values, for example in a list. For example, a search order can comprise sorting partitions 712 in ascending or descending order of corresponding partition values by one or multiple dimensions. As another example, a search order can comprise sorting the servers in ascending or descending order of corresponding server values by one or multiple dimensions.

The partitions and/or servers may be sorted by the same dimension, multiple dimensions, or all dimensions. For example, partitions 712 may be sorted in ascending or descending order of partition values that all correspond to dimension 710a. Alternatively, partitions 712 may be sorted in ascending or descending order of partition values regardless of corresponding dimension (e.g. by a maximum or minimum dimension of the partition). The servers can similarly be sorted in either of these manners by server values. In some implementations, at least one assignment heuristic comprises an unsorted or randomized list of partition values and/or server values, while other assignment heuristics may sort the list.

In some implementations, at least one candidate server is selected in an iteration of the searching, and in another iteration of the searching the at least one candidate server is updated to at least another server. The update may be based on a new candidate server having a greater available capacity or lower utilization in one or more dimensions. For example, servers 714 may be searched for assignment in a binary search or other type of search where each iteration of the search examines a different server or servers of servers 714 for the assignment. The at least one candidate server may be selected in one iteration and replaced by another server in a subsequent iteration. A new candidate server may have more available capacity, less utilization, or otherwise be more suitable for the partition or partitions being assigned.

In some implementations, any to all of the assignment heuristics comprise forming groups of servers 714 (and/or partitions 712) and sorting and/or searching those groups separately. For example, one group of servers can be based on the at least one (e.g. one or two) dimensions of a server that has the largest available capacity. An assignment heuristic can search that group for assignment of partitions in the at least one dimension prior to searching another group.

In various implementations, any to all of the assignment heuristics can be implemented utilizing at least one meta-heuristic. A meta-heuristic can correspond to an overarching commonality between assignment heuristics. For example, the aforementioned grouping described above may be implemented as a meta-heuristic. In particular, servers 714 and/or partitions 712 may be grouped and the different assignment heuristics may sort and/or search those groups in different manners, which can comprise bin packing.

The assignment plans can be determined in any order, which includes in parallel or serially. Furthermore, the assignment plans can be determined based on any of the dimensional values from assignment coordinator 702. Assignment generator 704 can be configured to provide assignment plans 722a, 722b, 722c, 722d, and/or other assignment plans to plan analyzer 706.

Plan analyzer 706 can be configured to receive assignment plans 722a, 722b, 722c, 722d, and/or other assignment plans from assignment generator 704. Furthermore, plan analyzer 706 can be configured to select assignment plan 726 from the assignment plans for execution on the scalable storage. The selection can comprise analyzing the assignment plans with respect to assignment criteria and selecting assignment plan 726 based on the assignment criteria.

The assignment criteria can take many different forms and account for many different factors. In various implementations, selecting one of the assignment plans for execution on the scalable storage is based on analyzing the dimensional values in accordance with the assignments of the assignment plans. The dimensional values can be selected from partition values and server values of the dimensions. For example, the analysis may be based on dimensional values that would correspond to the servers if the assignment plans were to be executed.

The selecting can comprise comparing dimensional values of servers between different assignment plans. In some implementations, the selection is based on a maximum or minimum dimensional value or sum of dimensional values in the assignment plan. For example, assignment plan 726 may be selected at least partially based on whether or not a partition value or server value of a server in the assignment plan is the largest or smallest of any server in any assignment plan. The selection can also be based on whether or not a server in the assignment plan is exceeding a cap value or how many servers or cap values are being exceeded in the assignment plan.

Calculating an optimal assignment plan with respect to assignment criteria can be an NP hard problem. Any given assignment heuristic may not reliably result in a highly optimal assignment plan with respect to the assignment criteria. However, utilizing multiple assignment heuristics can increase the probability that the selected assignment plan is consistently highly optimal while being generated by consuming significantly less resources of the scalable storage.

The selected one of the assignment plans may be executed on the scalable storage. In some cases, it may be desirable to ensure that at least one assignment plan will always be generated and selected for partitions to be assigned (e.g. partitions 712). Examples of such cases include where at least one partition to be assigned is presently unassigned to a server, or otherwise should be urgently assigned to a server. For example, any of the at least one partitions to be assigned may presently be assigned to or were previously assigned to one or more servers of the scalable storage that have failed, been shut down, or are otherwise unavailable for hosting.

However, it is noted that optionally, an assignment plan may not always be successfully generated and/or selected for execution on the scalable storage. For example, an assignment plan may not be urgently needed where the partitions to be assigned (e.g. partitions 712) are already assigned to a server. Therefore, it is noted that in some cases, it may be acceptable that none of the assignment heuristics are able to successfully generate an assignment plan. Furthermore, in some cases, it may be acceptable that one or more assignment plans are generated, but not selected, for example, where none of those plans satisfy assignment criteria. Also, in some cases, where an assignment plan is selected, the assignment plan may optionally have its execution be conditioned upon determining that the assignment plan would improve a load balance of the scalable storage.

Additional Heuristic Load Balancing Examples

Figure 8:
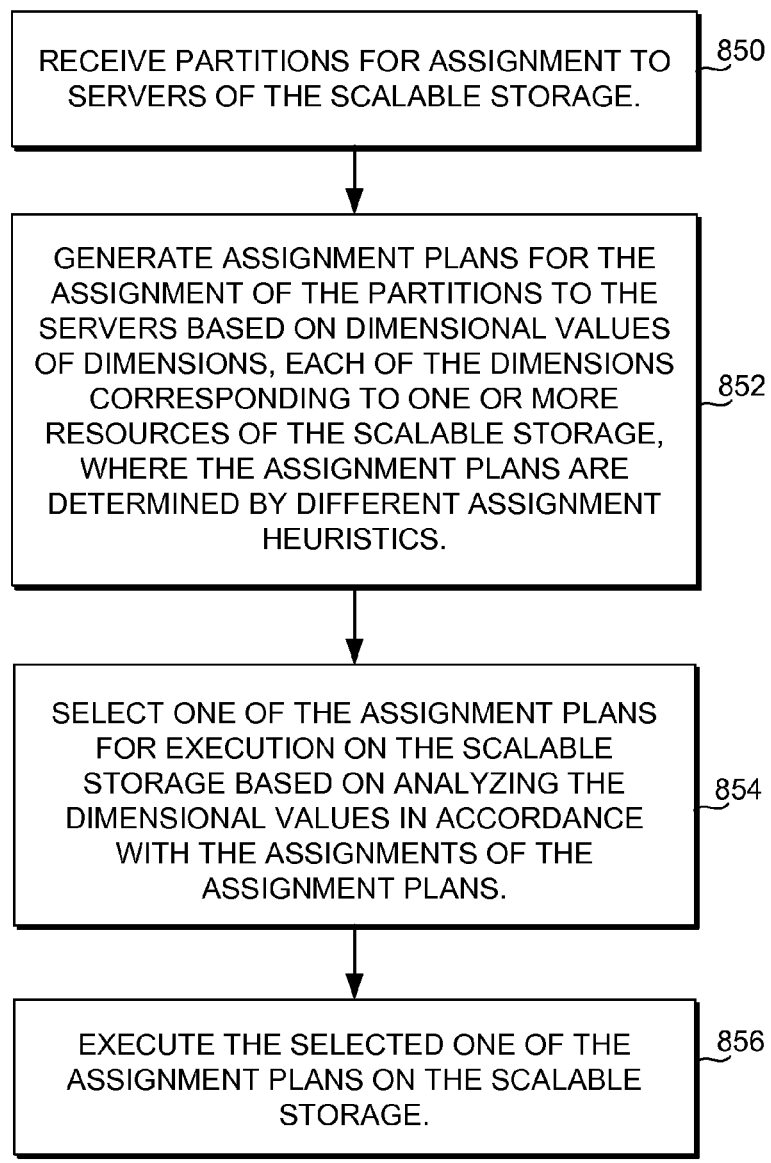
FIG. 8 depicts a flow diagram of an exemplary method for load balancing a scalable storage in accordance with implementations of the present disclosure.

Referring to FIG. 8, FIG. 8 depicts a flow diagram of an exemplary method for load balancing a scalable storage in accordance with implementations of the present disclosure. In particular, FIG. 8 depicts a flow diagram of method 800, in accordance with implementations of the present disclosure. In one aspect, a computer-implemented method for load balancing a scalable storage is provided (e.g. method 800 in FIG. 8). The method comprising: receiving partitions for assignment to servers of the scalable storage (e.g. 850 in FIG. 8), generating assignment plans for the assignment of the partitions to the servers based on dimensional values of dimensions, each of the dimensions corresponding to one or more resources of the scalable storage, wherein the assignment plans are determined by different assignment heuristics (e.g. 852 in FIG. 8), selecting one of the assignment plans for execution on the scalable storage based on analyzing the dimensional values in accordance with the assignments of the assignment plans (e.g. 854 in FIG. 8), and executing the selected one of the assignment plans on the scalable storage (e.g. 856 in FIG. 8).

Figure 9:
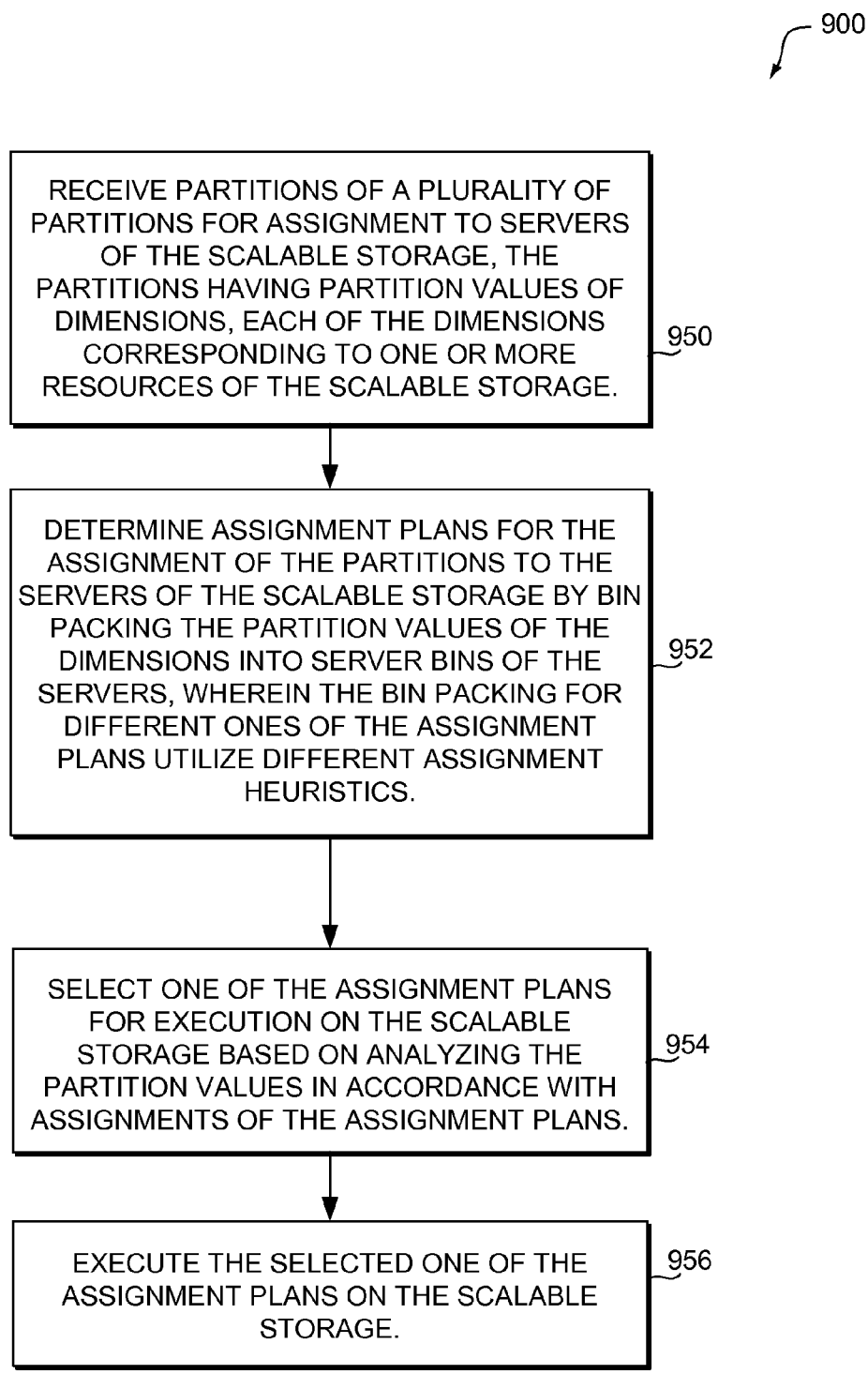
FIG. 9 depicts a flow diagram of an exemplary method for load balancing a scalable storage in accordance with implementations of the present disclosure.

Referring now to FIG. 9, FIG. 9 depicts a flow diagram of an exemplary method for load balancing a scalable storage in accordance with implementations of the present disclosure. In particular, FIG. 9 depicts a flow diagram of method 900, in accordance with implementations of the present disclosure. In one aspect, one or more computer-storage media storing computer-useable instructions that, when executed by a computing device, perform a method for load balancing scalable storage (e.g. method 900 in FIG. 9). The method comprising: receiving partitions of a plurality of partitions for assignment to servers of the scalable storage, the partitions having partition values of dimensions, each of the dimensions corresponding to one or more resources of the scalable storage (e.g. 950 in FIG. 9), determining assignment plans for the assignment of the partitions to the servers of the scalable storage by bin packing the partition values of the dimensions into server bins of the servers, wherein the bin packing for different ones of the assignment plans utilize different assignment heuristics (e.g. 952 in FIG. 9), selecting one of the assignment plans for execution on the scalable storage based on analyzing the partition values in accordance with assignments of the assignment plans (e.g. 954 in FIG. 9), and executing the selected one of the assignment plans on the scalable storage (e.g. 956 in FIG. 9).

Figure 10:
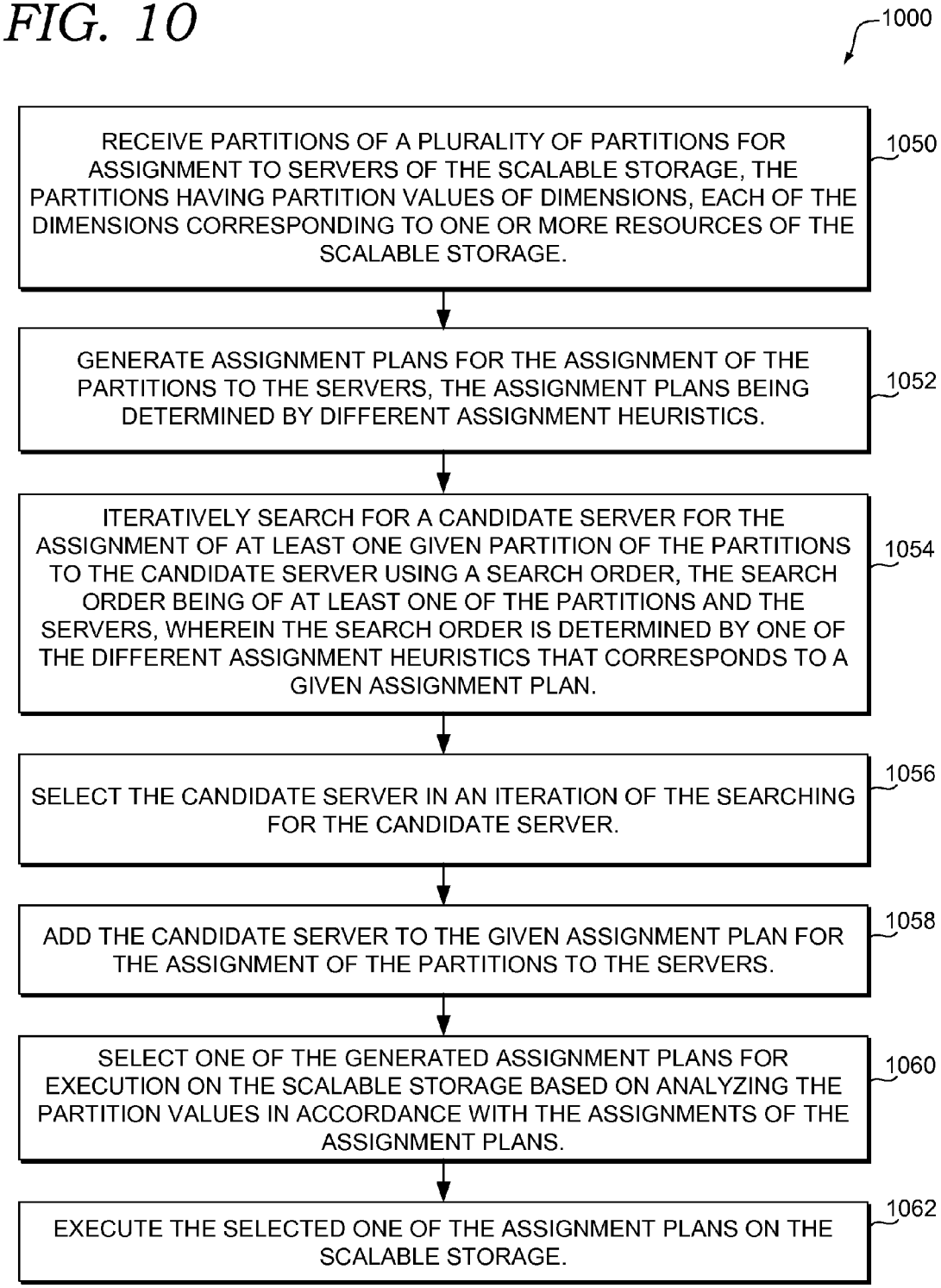
FIG. 10 depicts a flow diagram of an exemplary method for load balancing a scalable storage in accordance with implementations of the present disclosure.

Referring to FIG. 10, FIG. 10 depicts a flow diagram of an exemplary method for load balancing a scalable storage in accordance with implementations of the present disclosure. In particular, FIG. 10 depicts a flow diagram of method 1000, in accordance with implementations of the present disclosure. In one aspect, a computer-implemented method for load balancing a scalable storage is provided (e.g. method 1000 in FIG. 10). The method comprising: receiving partitions of a plurality of partitions for assignment to servers of the scalable storage, the partitions having partition values of dimensions, each of the dimensions corresponding to one or more resources of the scalable storage (e.g. 1050 in FIG. 10), generating assignment plans for the assignment of the partitions to the servers, the assignment plans being determined by different assignment heuristics (e.g. 1052 in FIG. 10), wherein for a given assignment plan of the assignment plans the generating comprising: iteratively searching for a candidate server for the assignment of at least one given partition of the partitions to the candidate server using a search order, the search order being of at least one of the partitions and the servers, wherein the search order is determined by one of the different assignment heuristics that corresponds to the given assignment plan (e.g. 1054 in FIG. 10), selecting the candidate server in an iteration of the searching for the candidate server (e.g. 1056 in FIG. 10), and adding the candidate server to the given assignment plan for the assignment of the partitions to the servers (e.g. 1058 in FIG. 10). The method further comprises selecting one of the generated assignment plans for execution on the scalable storage based on analyzing the partition values in accordance with the assignments of the assignment plans (e.g. 1060 in FIG. 10), and executing the selected one of the assignment plans on the scalable storage (e.g. 1062 in FIG. 10).

The heuristic based approaches can be implemented alongside other approaches, such as those described herein. For example, heuristic based approaches can be implemented alongside approaches based on one or more optimization modules that are employed to implement dimensional load balancing. In some implementations, master 202 of FIG. 2 can selected between the various approaches for load balancing the scalable storage. In particular, it has been contemplated that a heuristic based approach is typically significantly faster or otherwise more desirable in certain cases, such as when load balancing a large number of partitions. The selection can be based on, for example, any combination of the number of partitions that are subject to load balancing, the size of those partitions, whether those partitions are presently assigned to a server or are unassigned, the number of servers available for assignment, the available capacity of those servers, or other factors.

Selection of Partitions for Load Balancing

In another aspect, the present disclosure relates to selecting partitions for assignment. For example, at least some of partitions 712 described with respect to FIG. 7 may have been selected for offload from their corresponding servers. Various concepts related to selecting partitions for assignment can be applied to any of the load balancing approaches described herein, or may be implemented utilizing different approaches.

Various considerations have been contemplated in selecting partitions for assignment. More important partitions may have a greater impact on the scalable storage when unavailable than less important partitions. Therefore, in one respect, it may be desirable to prioritize the selection of partitions that have lower importance levels than others. Furthermore, assigning partitions to servers can have certain associated costs and overhead. Thus, in another respect, it may be desirable to minimize the number of partitions selected for assignment, if possible. Although precisely minimizing the number of partitions every time may be impractical, one suitable approach may select servers for offload from the most overloaded servers. In doing so, provisions may be made so that removal of partitions would not substantially overshoot reductions in server values, as partitions values of those partitions may be large and difficult to assign.

As indicated above, in some respects, selecting partitions for assignment is based on importance levels of the partitions of the scalable storage, such as any of partitions P1, P2, P3, P4, P5, and P6 in FIG. 2. An importance level generally can quantify the importance of offloading a partition or group of partitions, for example, with respect to another partitions or partitions. Importance levels may be defined for at least some of the partitions utilizing a weight value, importance score, or other ranking.

In some implementations, the importance levels are user defined. For example, a user or users may assign different importance levels to different classes of partitions. The importance levels can also be calculated or otherwise derived from any of various factors, such as live traffic, historical traffic, account priorities of accounts that own or are associated with the partitions, resource utilization, partition values, load balancing penalties, penalty scores, and many more. Some partitions may be not be assigned an importance level by a user or users. These partitions may be assigned a default importance level, may have their importance level calculated or determined, or may otherwise be accounted for in selecting partitions for offload.

In various implementations, in selecting partitions for offload, partitions having lower importance levels may be analyzed prior to or otherwise be given priority in selecting partitions for offload. In some implementations, selecting partitions for offload comprises determining candidate partitions of a plurality of partitions for offload based on at least importance levels that are associated with the plurality of partitions. The selected candidate partitions may be analyzed prior to others of the plurality of partitions that have different importance levels (e.g. higher importance levels).

In some implementations, the candidate partitions are analyzed for offload in one iteration of selecting partitions for offload, and in a subsequent iteration, at least one other partition of the plurality of partitions are added to the candidate partitions, for example, based on an importance level(s) that is associated with the at least one other partitions. For example, the at least one other partition may be added based on having a higher importance level(s) than the partitions in the candidate partitions. Iteratively adding to the candidate operations is one approach to favoring partitions that have lower importance levels in the selection of partitions for offload.

In some implementations, the selecting of the partitions for offload may conditionally be iterated, for example, based on whether or not a partition or partitions have been selected for offload in that iteration, and/or cumulatively in multiple iterations. These considerations may further be based on the number of partitions that have been selected or whether other selection criterion has been satisfied.

In addition to, or instead of importance levels, selecting partitions for offload can optionally favor the selection of fewer partitions. In this respect, analyzing and/or selecting partitions for offload may first seek to select a limited number of partitions for offload from a given server (e.g. one or two partitions). If, for example, the given server cannot be brought under or to capacity on one or more dimensions by removing the limited number of partitions, more partitions may be considered when selecting partitions for offload. For example, the limited number may be increased and/or any number of partitions may be selectable in subsequent analysis.

In some implementations, selecting partitions for offload comprises determining an offload score for at least some of the candidate partitions. An offload score can quantify a partition's suitability for offload for its corresponding server. Furthermore, the offload score may be based on any combination of a cap value and/or server value of the corresponding server, at least one partition value, and/or other dimensional values. In some respects, the offload score can be based on comparing the at least one partition value to a cap value that corresponds to the same dimension. For example, the offload score may be based on a difference between a partition value or values and a server cap or caps that corresponds to the same dimension as the partition value or values.

Where removal of the partition from assignment to a server would result in a dimension(s) of the server no longer being overloaded, a lower difference may correspond to a higher offload score than a higher difference. In this way, partitions can be favored for offload without removing partitions that have excessively large partition values that may be difficult to assign to other servers and/or without resulting in underutilization of the server with respect to dimensions.

In some implementations, ranges and/or thresholds may be employed for determining the offload values. The ranges and/or threshold can correspond to utilization of a server with respect to a dimension or dimensions that would result from offloading the partition, and may be referenced to a cap value of a server. For example, being substantially equal to the cap value may correspond to one offload score, from the cap value to a first threshold below the cap value (e.g. 95% of the cap value) may correspond to a higher offload score, from the first threshold to a second threshold further below the cap value (e.g. 75% of the cap value) may correspond to a lower offload score, and below the second threshold may be result in an even lower offload score (e.g. 0). Where the server would still be overloaded with respect to the dimension(s) after removal, the offload score can also be lower than any of the aforementioned scores (e.g. 0). It is noted that more or fewer ranges and/or threshold can be utilized and may account for different factors than described.

Selecting partitions for offload can comprise limiting the number of partitions that can be selected for offload from a given server. For example, the number may be limited to one partition per server. The number may be increased, for example, if not enough partitions have been selected for offload, or no partitions have been selected for offload. In one implementation, only one partition is selected for offload from any given server, which can be the partition for that server that has the highest offload score for that server. However, if no partitions were selected for offload (or less than a threshold amount), the selecting may consider pairs of partitions (or more than two partitions, or an unlimited number of partitions) for removal from a corresponding server. The number of partitions considered may increase incrementally until certain selection criteria are satisfied.

Selecting partitions for offload can also comprise a subset sum (e.g. vector subset sum) analysis of partitions values that correspond to a server. In other words, the subset sum can consider sums of the partition values as compared to a cap value of the server. Corresponding partitions can be selected for removal based on the subset sum analysis of the partition values. The subset sum may be implemented incrementally and at least some increments may be conditioned upon selection criterion that is based on at least one previous increment. For example, the selection criterion may be that at least one partition or a given number of partitions has been selected in the previous iteration or iterations. Iterations may remove previously selected partitions from selection or may be cumulative with those selected partitions.

In some implementations, in a first iteration, the subset sum analysis selects partitions for removal (e.g. any number of partitions or a given number) that would result in a first level of utilization with respect to a server cap of the server (e.g. equal to the server cap). In any subsequent iteration, the level of utilization with respect to the server can be reduced to a lower level of utilization, which may be further reduced in any subsequent iteration. As a specific example, where a server cap is 100 and a server value is 120, the subset sum analysis may be employed to seek out partitions for selection such that the server value would be 100, 90, 80, 70, 60, and 50 in different iterations of analysis. In this way, the analysis can favor maintaining certain levels of utilization of the servers so as to prevent overshooting a cap value.

Considerations in Generating Assignment Plans for Selected Partitions

Having selected partitions for offload, those partitions may be incorporated into one or more assignment plans, for example, utilizing any suitable approach described herein or other approaches. In some implementations, an assignment plan is generated for the selected partitions. It is further determined whether or not executing the assignment plan would improve a load balance in the scalable storage prior to executing the assignment plan on the scalable storage. The assignment plan may be executed based on determining that executing the assignment plan would improve the load balance of the scalable storage. However, a new set of partitions may be selected for offload based on determining that executing the assignment plan would not improve the load balance of the scalable storage. This may optionally repeat until a suitable assignment plan is determined and executed.

In some implementations, the determination comprises dividing the servers into sets. One set can correspond to servers that have partitions that are to be offloaded in the assignment plan (also referred to as first server set). Another set can correspond to servers to which those partitions are to be assigned (also referred to as second server set). It will be appreciated that these sets can overlap. For each dimension in each set, it can be determined which partition value is highest. This can result in a set of those partition values for the first server set (also referred to as a first partition value set) and a set of those partition values for the second server set (also referred to as a second partition value set). Each set may be represented as a vector.

The first partition value set can be compared to the second partition value set to determine whether the assignment plan would improve the load balance. If a partition value in the first partition value set was greater than the server cap for its corresponding dimension, an improvement may correspond to the highest partition value for that dimension decreasing in the second partition value set. If a partition value in the first partition value set was less than the server cap for its corresponding dimension, an improvement may correspond to the highest partition value for that dimension being less than or equal to the server cap for that dimension in the second partition value set. These evaluations can be performed for each partition value. Furthermore, the evaluations can individually be determinative of the overall determination of improvement as to the load balance. For example, the load balance may only be considered improved if each evaluation corresponds to an improvement. In another approach, those evaluations can be cumulative or otherwise be considered in combination, such that no single evaluation is determinative.

Additional Example with Assignment Plans and Selection of Partitions

Figure 11:
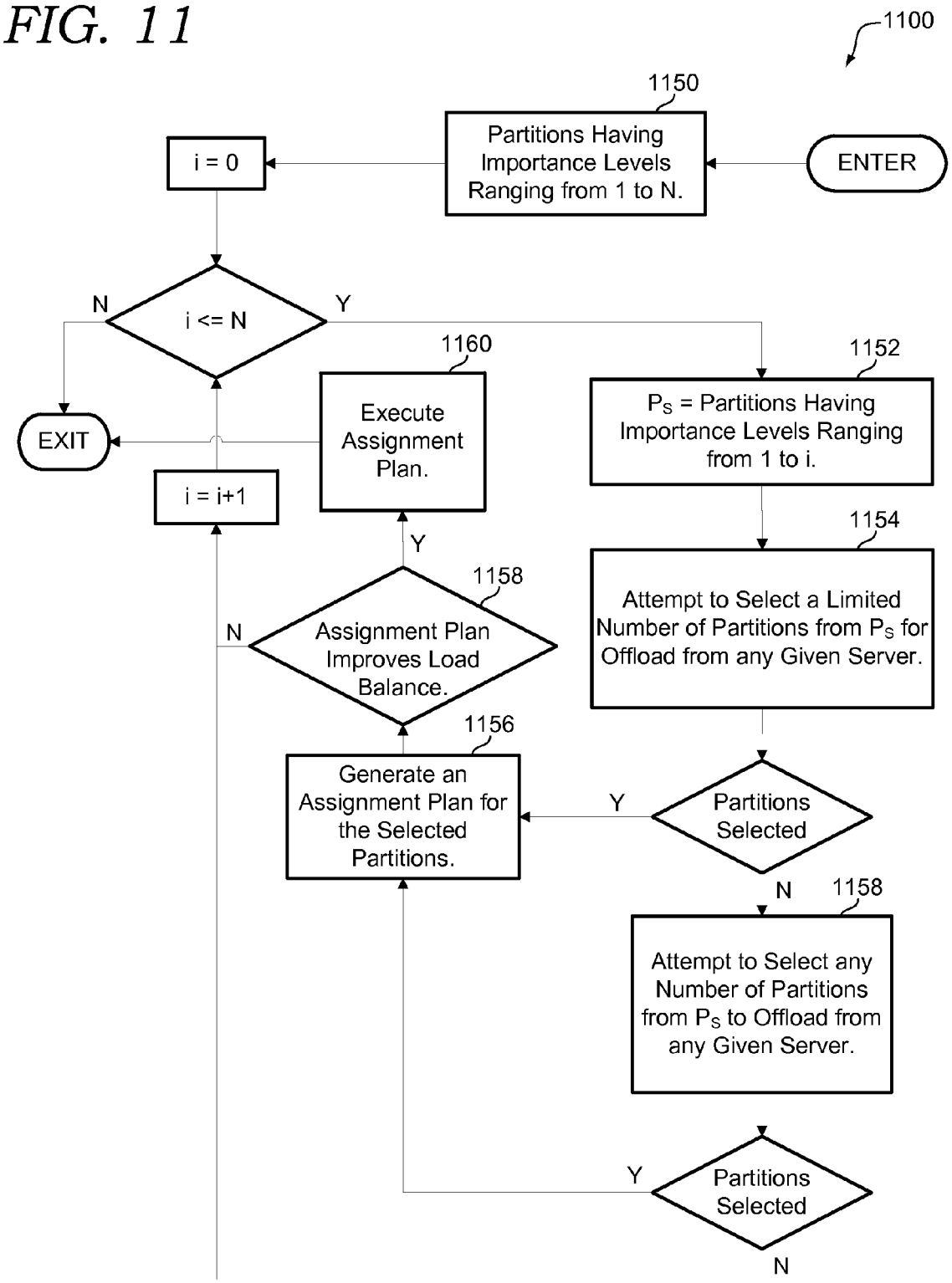
FIG. 11 depicts a flow diagram of an exemplary method for load balancing a scalable storage in accordance with implementations of the present disclosure.

Referring now to FIG. 11 depicts a flow diagram of an exemplary method for load balancing a scalable storage in accordance with implementations of the present disclosure. In particular, FIG. 11 shows method 1100 which can implement various concepts described herein. Method 1100 begins with receiving partitions having importance values ranging from 1 to N (1150 in FIG. 11). Each importance value corresponds to an importance level and can be represented as integers. The specific example shown includes N importance levels. Furthermore, lower integers can correspond to lower importance levels than partitions having higher integers. This relationship is merely exemplary and can be altered.

Method 1100 can analyze partitions $P_S$ for selection for offload, where partitions $P_S$ correspond to the partitions that have importance values ranging from 1 to i. If subsequent iterations occur, additional partitions having lower importance levels are added to partitions $P_S$ by incrementing i. When there are no remaining partitions for consideration, method 1100 may terminate without having executed an assignment plan. Subsequent iterations may not occur if partitions are successfully selected for offload from a previous version of partitions $P_S$ and an assignment plan is executed (1160 in FIG. 11) based on a previous version of partitions $P_S$. Although referred to in plural, partitions $P_S$ may include one or more partitions. Furthermore, only one partition or many partitions may be selected and executed.

Method 1100 attempts to select a limited number of partitions from partitions $P_S$ for offload from any given server (e.g. utilizing offload scores). Many exemplary approaches are described above and are not reiterated. If the selection is successful, an assignment plan may be generated for the selected partitions (1156 in FIG. 11). The assignment plan can be generated in any suitable manner and utilizing any suitable approach, such as heuristic based approaches described herein.

If no partitions are selected, method 1100 can alter its selection criteria and selection methodology (e.g. utilizing subset sum analysis), for example, by attempting to select any number of partitions from partitions $P_S$ for offload from any given server (1158 in FIG. 11). Many exemplary approaches are described above and are not reiterated. If the selection is successful, an assignment plan may be generated for the selected partitions (1156 in FIG. 11). The assignment plan can be generated in any suitable manner and utilizing any suitable approach, such as heuristic based approaches described herein.

Method 1100 can comprise determining whether or not executing the assignment plan would improve a load balance of the scalable storage prior to executing the assignment plan on the scalable storage (1158 in FIG. 11). This may be accomplished in any suitable manner and utilizing any suitable approach, such approaches described above. As can be seen in FIG. 11, the assignment plan may be executed based on determining that executing the assignment plan would improve a load balance of the scalable storage. However, method 1100 may consider additional partitions for selection based on determining that executing the assignment plan would not improve a load balance of the scalable storage.

Thus, in accordance with implementations of the present disclosure, load balancing scalable storage can be implemented utilizing any of the various approaches described herein. Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. A computer-implemented method for load balancing a scalable storage, the method comprising:

receiving partitions of a plurality of partitions for assignment to servers of the scalable storage, the partitions having partition values of dimensions, each of the dimensions corresponding to one or more resources of the scalable storage;

generating assignment plans that each describe which particular partitions of the partitions are to be assigned to which particular servers of the servers, the assignment plans being determined by different assignment heuristics applied to a common state of the scalable storage, wherein for each given assignment plan of the assignment plans the generating comprises:

iteratively searching for a candidate server for the assignment of at least one given partition of the partitions to the candidate server using a search order, the search order being of at least one of the partitions and the servers, wherein the search order is determined by one of the different assignment heuristics that corresponds to the given assignment plan;

selecting the candidate server in an iteration of the searching for the candidate server; and adding the candidate server to the given assignment plan for the assignment of the partitions to the servers;

selecting one of the generated assignment plans for execution on the scalable storage based on analyzing the partition values in accordance with the assignments of the assignment plans;

executing the selected one of the assignment plans on the scalable storage.

2. The computer-implemented method of claim 1, wherein the search order is based on sorting the partitions by the partition values of a given dimension.

3. The computer-implemented method of claim 1, wherein the search order is based on sorting the servers by server values of a given dimension.

4. The computer-implemented method of claim 1, comprising normalizing the partition values to a notionally common scale.

5. The computer-implemented method of claim 1, wherein in one iteration of the searching the candidate server corresponds to one server, and in another iteration of the searching the candidate server is updated to another server based on the another server having a greater available capacity for the at least one of the partition values of the selected partition.

6. The computer-implemented method of claim 1, wherein the searching comprises a binary search of the servers.

7. The computer-implemented method of claim 1, wherein the selecting one of the generated assignment plans comprises comparing dimensional values of servers between different assignment plans, the dimensional values being selected from partition values and server values of the dimensions.

8. The computer-implemented method of claim 1, comprising:
analyzing a first group of the plurality of partitions for selection for offload;
selecting ones of the partitions from the first group for offload;
determining that an assignment plan for the ones of the partitions would not improve a load balance of the scalable storage;
selecting the partitions of the plurality of partitions from a second group of the plurality of partitions, the second group comprising at least one partition that has a higher importance level than importance levels of the first group of the plurality of partitions.

9. The computer-implemented method of claim 1, wherein at least some of the partitions are from at least one server of the scalable storage that has a dimensional value of at least one of the dimensions that is exceeding a cap value.

10. One or more computer-storage media storing computer-useable instructions that, when executed by a computing device, perform a method for load balancing scalable storage, comprising:
receiving partitions of a plurality of partitions for assignment to servers of the scalable storage, the partitions having partition values of dimensions, each of the dimensions corresponding to one or more resources of the scalable storage;

determining assignment plans that each describe which particular partitions of the partitions are to be assigned to which particular servers of the servers by bin packing the partition values of the dimensions into server bins of the servers, wherein the bin packing for different ones of the assignment plans utilize different assignment heuristics applied to a common state of the scalable storage;

selecting one of the assignment plans for execution on the scalable storage based on analyzing the partition values in accordance with assignments of the assignment plans;

executing the selected one of the assignment plans on the scalable storage.

11. The one or more computer-storage media of claim 10, wherein each server bin of the server bins has a volume corresponding to a cap value of ones of the dimensions of the server bin.

12. The one or more computer-storage media of claim 10, wherein the bin packing for at least some of the assignment plans share a common meta-heuristic.

13. The one or more computer-storage media of claim 10, wherein the bin packing for at least some of the assignment plans share a common meta-heuristic that comprises forming at least first and second groups of servers and performing the bin packing on the first group of servers prior to the second group of servers.

14. The one or more computer-storage media of claim 10, wherein the bin packing comprises iteratively searching for a server bin for a partition using a search order, the search order being of at least one of the partitions and the servers.

15. The one or more computer-storage media of claim 10, determining that the selected one of the assignment plans of the scalable storage would improve a load balance of the scalable storage prior to executing the selected one of the assignment plans on the scalable storage.

16. A computer-implemented method for load balancing a scalable storage, the method comprising:
receiving partitions for assignment to servers of the scalable storage;
generating assignment plans that each describe which particular partitions of the partitions are to be assigned to which particular servers of the servers based on dimensional values of dimensions, each of the dimensions corresponding to one or more resources of the scalable storage, wherein the assignment plans are determined by different assignment heuristics applied to a common state of the scalable storage;
selecting one of the assignment plans for execution on the scalable storage based on analyzing the dimensional values in accordance with the assignments of the assignment plans, wherein at least one of the assignment plans causes a dimension of the dimensions to exceed a cap value of the dimension in the common state;
executing the selected one of the assignment plans on the scalable storage.

17. The computer-implemented method of claim 16, wherein the dimensional values comprise partition values of the dimensions.

18. The computer-implemented method of claim 16, wherein the dimensional values comprise server values of the dimensions.

19. The computer-implemented method of claim 16, comprising selecting the partitions for assignment to the servers based on importance levels of the partitions.

20. The computer-implemented method of claim 16, wherein one of the dimensions comprises a partition count dimension.

21. A computer-implemented method for load balancing a scalable storage, the method comprising:
determining, for a triggered optimization module of a plurality of optimization modules, that at least one server of the scalable storage is over utilized on a dimension that corresponds to one or more resources of the scalable storage, each optimization module of the plurality of optimization modules quantifying a different optimization goal in a respective evaluation score, comprising a different trigger condition that when satisfied causes execution of a respective optimization routine, and comprising a respective priority;
optimizing the scalable storage based on the respective optimization routine of the triggered optimization module, the optimization routine comprising:
selecting a plurality of candidate operations that are potential load balancing operations associated with partitions assigned to the at least one server of the scalable storage;
based on the respective priority of a selected optimization module of the plurality of optimization modules being a higher priority than the triggered optimization module, removing a candidate operation from the plurality of candidate operations based on determining that the candidate operation would diminish a modeled state of the scalable storage as quantified by the respective evaluation score of the selected optimization module; and
determining at least one operation of the plurality of candidate operations that would improve the modeled state of the scalable storage with respect to a metric of the dimension on the at least one server as quantified by the respective evaluation score of the triggered optimization module, the metric quantifying utilization of the one or more resources;
executing the at least one operation on the scalable storage.

22. The computer-implemented method of claim 21, wherein the optimization routine further comprises updating the modeled state of the scalable storage to model executing the at least one operation on the scalable storage.

23. The computer-implemented method of claim 21, wherein the optimization routine further comprises adding the at least one operation to a set of proposed operations.

24. The computer-implemented method of claim 21, comprising filtering out one or more of the plurality of candidate operations based on a penalty associated with performing the one or more of the plurality of candidate operations on the partitions of the scalable storage.

25. The computer-implemented method of claim 21, wherein the evaluation score of the triggered optimization module is based on a plurality of metrics of a plurality of dimensions and corresponding weight values of the plurality of dimensions.

26. The computer-implemented method of claim 21, wherein the evaluation score of the triggered optimization module corresponds to a plurality servers of the scalable storage.

27. The computer-implemented method of claim 21, wherein performing any of the plurality of candidate operations would reduce the metric of the dimension on the at least one server.

28. The computer-implemented method of claim 21, comprising for another selected optimization module of the plurality of optimization modules that has a lower priority than the triggered optimization module, removing a candidate operation from the plurality of candidate operations that would diminish the modeled state of the scalable storage as quantified by an evaluation score of the another selected optimization module.

29. The computer-implemented method of claim 21, wherein the metric comprises a server metric of the dimension or a process metric of the dimension.

30. One or more computer-storage media storing computer-useable instructions that, when executed by a computing device, perform a method for load balancing scalable storage, comprising:
determining that a trigger condition of a triggered optimization module of a plurality of optimization modules is met, each of the plurality of optimization modules quantifying a different optimization goal in a respective evaluation score;
identifying a plurality of servers of the scalable storage that have a metric exceeding a cap value for at least one dimension of a plurality of dimensions, the metric being of a plurality of metrics that quantify utilization of one or more resources of the plurality of dimensions with respect to the plurality of servers;
selecting at least one server of the plurality of servers based on a load metric of the at least server, the load metric being based on the plurality of metrics;
providing a plurality of candidate operations, wherein the plurality of candidate operations are potential load balancing operations associated with partitions assigned to the at least one server;
removing a candidate operation from the plurality of candidate operations based on determining that the candidate operation would diminish a modeled state of the scalable storage as quantified by the respective evaluation score of the selected optimization module; and
selecting at least one operation of the plurality of candidate operations based on the respective evaluation score of the triggered optimization module;
executing the at least one operation on the scalable storage.

31. The one or more computer-storage media of claim 30, wherein the load metric is based on the plurality of metrics of the plurality of dimensions and corresponding weight values of the plurality of dimensions.

32. The one or more computer-storage media of claim 30, wherein the selecting the at least one server is based on calculating the load metric for each of the plurality of servers.

33. The one or more computer-storage media of claim 30, wherein the selecting the at least one server comprises comparing the load metric with respect to different ones of the plurality of servers.

34. The one or more computer-storage media of claim 30, wherein the providing the plurality of candidate operations comprises adding the partitions that are assigned to the at least one server to a candidate partition set; and
generating the plurality of candidate operations from the candidate partition set.

35. The one or more computer-storage media of claim 30, wherein providing the plurality of candidate operations comprises adding servers of the scalable storage to a candidate target server set based on the load metric with respect to the servers;
generating the plurality of candidate operations from the candidate target server set.

36. A computer-implemented method for load balancing a scalable storage, the method comprising:

determining that a trigger condition of a triggered optimization module of a plurality of optimization modules is met, each of the plurality of optimization modules quantifying a different optimization goal in a respective evaluation score;

selecting at least one source server of a plurality of servers of the scalable storage that has a metric exceeding a cap value for at least one dimension of a plurality of dimensions, the metric being of a plurality of metrics that quantify utilization of one or more resources of the plurality of dimensions with respect to the plurality of servers;

determining a plurality of destination servers for receiving partitions that are assigned to the at least one source server based on a load metric with respect to the plurality of servers, the load metric being based on the plurality of metrics;

generating a plurality of candidate operations, wherein each the plurality of candidate operations are potential load balancing operations that correspond to at least one of the partitions assigned to the at least one source sever being received by at least one of the plurality of destination servers;

removing a candidate operation from the plurality of candidate operations based on determining that the candidate operation would diminish a modeled state of the scalable storage as quantified by the respective evaluation score of the selected optimization module;

selecting at least one operation of the plurality of candidate operations based on the respective evaluation score of the triggered optimization module;

executing the at least one operation on the scalable storage.

37. The computer-implemented method of claim 36, comprising adding partitions that are assigned to the at least one source server to a candidate partition set, wherein the plurality of candidate operations are generated from the candidate partition set.

38. The computer-implemented method of claim 36, comprising adding the plurality of destination servers to a candidate target server set, wherein the plurality of candidate operations are generated from the candidate target server set.

39. The computer-implemented method of claim 36, wherein the plurality of candidate operations comprise movement operations on the partitions assigned to the at least one source server to destination servers selected from the plurality of destination servers.

40. The computer-implemented method of claim 36, wherein the plurality of candidate operations correspond to a Cartesian product of the plurality of destination servers and the partitions assigned to the at least one source server.

* * * * *